(12) United States Patent
Xu et al.

(10) Patent No.: US 10,742,476 B2
(45) Date of Patent: Aug. 11, 2020

(54) DATA PACKET PROCESSING METHOD AND DEVICE

(71) Applicant: Huawei Technologies Co., Ltd., Shenzhen (CN)

(72) Inventors: Yixu Xu, Shanghai (CN); Han Zhou, Shanghai (CN); Zhongping Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/862,155

(22) Filed: Jan. 4, 2018

(65) Prior Publication Data

US 2018/0145868 A1 May 24, 2018

Related U.S. Application Data

(63) Continuation of application No. PCT/CN2015/088630, filed on Aug. 31, 2015.

(51) Int. Cl.
*H04L 12/24* (2006.01)
*H04W 88/16* (2009.01)
(Continued)

(52) U.S. Cl.
CPC ........... *H04L 41/022* (2013.01); *H04W 88/16* (2013.01); *H04L 69/22* (2013.01); *H04L 2212/00* (2013.01); *H04W 84/042* (2013.01)

(58) Field of Classification Search
CPC ... H04L 41/022; H04L 2212/00; H04L 69/22; H04W 88/16; H04W 84/042
See application file for complete search history.

(56) References Cited

U.S. PATENT DOCUMENTS

2008/0107014 A1* 5/2008 Huang ................. H04W 28/16
370/216
2013/0286821 A1* 10/2013 Liu ....................... H04W 88/16
370/225
(Continued)

FOREIGN PATENT DOCUMENTS

CN  101562906 A  10/2009
CN  102695291 A  9/2012
(Continued)

OTHER PUBLICATIONS

"SDN based architecture for EPC", SA WG2 Meeting #102 S2-141021, Malta, (Mar. 24-28, 2014).
(Continued)

*Primary Examiner* — Christine Ng
(74) *Attorney, Agent, or Firm* — Leydig, Voit & Mayer, Ltd.

(57) ABSTRACT

The present invention relates to the field of mobile communications technologies, and in particular, to a gateway system, so as resolve a technical problem of a complex network structure caused due to that different network architectures need different gateways. The gateway system provided in the present invention separates a control plane from a forwarding plane. A gateway controller is configured to complete a control function, and may control respective generation of control information for data packets of multiple different protocol types. A gateway forwarding device is responsible for forwarding, and may be controlled by the gateway controller to receive and send data packets of various protocol types. In a multi-standard access architecture, only one or few such gateway systems may need to be accessed instead of accessing multiple different gateways, thereby simplifying a network topology structure, and facilitating network maintenance.

20 Claims, 4 Drawing Sheets

---

A gateway forwarding device receives a first packet according to first control information generated by a gateway controller, where the first control information is used to indicate a manner of processing the first packet — 301

The gateway forwarding device parses the first packet according to the first control information — 302

(51) Int. Cl.
*H04L 29/06* (2006.01)
*H04W 84/04* (2009.01)

(56) References Cited

U.S. PATENT DOCUMENTS

| | | | |
|---|---|---|---|
| 2014/0236476 A1 | 8/2014 | Khorashadi et al. | |
| 2015/0023176 A1* | 1/2015 | Korja | H04L 45/42 |
| | | | 370/236 |
| 2015/0195684 A1* | 7/2015 | Lohmar | H04W 4/06 |
| | | | 370/312 |

FOREIGN PATENT DOCUMENTS

| | | |
|---|---|---|
| CN | 102932216 A | 2/2013 |
| CN | 103200532 A | 7/2013 |
| EP | 2757825 A1 | 7/2014 |

OTHER PUBLICATIONS

"Feasibility Study on Control and User Plane Separation of EPC nodes," SA WG2 Meeting #S2-110 S2-152709,(e-mail revision 25 of S2-152662), Dubrovnik, Croatia (Jul. 6-10, 2015).
"Solution to Key Issue 1—Single gateway controller", SA WG2 Meeting#112 S2-154089, Anaheim, (Nov. 16-20, 2015).

* cited by examiner

DATA PACKET PROCESSING METHOD AND DEVICE

CROSS-REFERENCE TO RELATED APPLICATIONS

This application is a continuation of International Application No. PCT/CN2015/088630, filed on Aug. 31, 2015, the disclosure of which is hereby incorporated by reference in its entirety.

TECHNICAL FIELD

The present invention relates to the field of communications technologies, and in particular, to a data packet processing method and device.

BACKGROUND

Currently, gateways with different functions are required in different network architectures. For example, in a 3rd Generation Partnership Project (3GPP) access scenario, a required gateway is an serving gateway (SGW) or a packet data network gateway (PGW). If the SGW and the PGW are considered as two function modules, the two function modules may be located in two independent entities, that is, the SGW and the PGW are two different gateways, or the two function modules may be located in a same entity, that is, the entity has functions of the SGW and the PGW.

Currently, the SGW supports forwarding of a data packet of, for example, General Packet Radio Service Tunneling Protocol (GTP) or Proxy Mobile Internet Protocol (PMIP), and the PGW supports forwarding of a data packet of, for example, the GTP, the PMIP, or Layer 2 Tunneling Protocol (L2TP). In an untrusted non-3GPP access manner, a required gateway is an evolved packet data gateway (ePDG), and the ePDG supports forwarding of a data packet of, for example, Internet Protocol security (IPsec), the GTP, or the PMIP. In a trusted non-3GPP access manner, a required gateway is a trusted access gateway (TGW), and the TGW supports forwarding of a data packet of, for example, generic routing encapsulation (GRE), layer 2 virtual local area network (VLAN), the GTP, or the PMIP.

Therefore, in different network architectures, multiple different gateways need to be deployed. In a multi-standard access architecture, there may be a relatively large quantity of gateway types. As a result, a network topology is complex and is difficult to maintain.

SUMMARY

Embodiments of the present invention provide a data packet processing method and device, so as to resolve a technical problem of a complex network structure caused due to that different network architectures need different gateways.

According to a first aspect, a gateway system is provided, including:

a gateway controller, configured to generate control information for different network standards; and a gateway forwarding device, configured to receive and send, according to each piece of control information generated by the gateway controller, a data packet generated in a network standard corresponding to each piece of control information.

With reference to the first aspect, in a first possible implementation of the first aspect, the data packet includes any one or more of a GTP data packet, a PMIP data packet, an L2TP data packet, an IPSec data packet, a GRE data packet, or a VLAN data packet.

According to a second aspect, a data packet processing method is provided, including:

receiving, by a gateway forwarding device, a first data packet according to first control information generated by a gateway controller, where the first control information is used to indicate a manner of processing the first data packet; and parsing, by the gateway forwarding device, the first data packet according to the first control information.

With reference to the second aspect, in a first possible implementation of the second aspect, the first data packet is an uplink data packet or a downlink data packet.

With reference to the first possible implementation of the second aspect, in a second possible implementation of the second aspect, the gateway forwarding device and the gateway controller function as an SGW, or the gateway forwarding device and the gateway controller function as an SGW and a PGW, and the first data packet is an uplink data packet;

the receiving, by a gateway forwarding device, a first data packet according to first control information generated by a gateway controller includes:

receiving, by the gateway forwarding device, the first data packet according to SGW user plane information included in the first control information generated by the gateway controller, where the SGW user plane information is used to define a manner of processing a data packet received from an S1-U interface; and the parsing, by the gateway forwarding device, the first data packet according to the first control information includes:

decapsulating, by the gateway forwarding device, the first data packet according to the SGW user plane information.

With reference to the second possible implementation of the second aspect, in a third possible implementation of the second aspect, the receiving, by the gateway forwarding device, the first data packet according to SGW user plane information included in the first control information generated by the gateway controller includes:

receiving, by an interface object of the gateway forwarding device, the first data packet according to the SGW user plane information, where the interface object is used to receive a data packet from another device; and the decapsulating, by the gateway forwarding device, the first data packet according to the SGW user plane information includes:

decapsulating, by a link object of the gateway forwarding device, the first data packet according to the SGW user plane information, where the link object is used to decapsulate a data packet.

With reference to the first possible implementation of the second aspect, in a fourth possible implementation of the second aspect, the gateway forwarding device and the gateway controller function as a PGW, and the first data packet is an uplink data packet;

the receiving, by a gateway forwarding device, a first data packet according to first control information generated by a gateway controller includes:

receiving, by the gateway forwarding device, the first data packet according to PGW user plane information included in the first control information generated by the gateway controller, where the PGW user plane information is used to define a manner of processing a data packet received from an S5/S8 interface; and the parsing, by the gateway forwarding device, the first data packet according to the first control information includes:

decapsulating, by the gateway forwarding device, the first data packet according to the PGW user plane information.

With reference to the fourth possible implementation of the second aspect, in a fifth possible implementation of the second aspect, the receiving, by the gateway forwarding device, the first data packet according to PGW user plane information included in the first control information generated by the gateway controller includes:

receiving, by an interface object of the gateway forwarding device, the first data packet according to the PGW user plane information, where the interface object is used to receive a data packet from another device; and the decapsulating, by the gateway forwarding device, the first data packet according to the PGW user plane information includes:

decapsulating, by a link object of the gateway forwarding device, the first data packet according to the PGW user plane information, where the link object is used to decapsulate a data packet.

With reference to the first possible implementation of the second aspect, in a sixth possible implementation of the second aspect, the gateway forwarding device and the gateway controller function as an ePDG, and the first data packet is an uplink data packet;

the receiving, by a gateway forwarding device, a first data packet according to first control information generated by a gateway controller includes:

receiving, by the gateway forwarding device according to the first control information generated by the gateway controller, the first data packet sent by a terminal; and the parsing, by the gateway forwarding device, the first data packet according to the first control information includes:

decrypting, by the gateway forwarding device, the first data packet according to an SPI and a corresponding key that are included in the first control information, and an SPI of the first data packet.

With reference to the sixth possible implementation of the second aspect, in a seventh possible implementation of the second aspect, the receiving, by the gateway forwarding device according to the first control information generated by the gateway controller, the first data packet sent by a terminal includes:

receiving, by an interface object of the gateway forwarding device, the first data packet according to the first control information, where the interface object is used to receive a data packet from another device; and the decrypting, by the gateway forwarding device, the first data packet according to an SPI and a corresponding key that are included in the first control information, and an SPI of the first data packet includes:

decrypting, by a session object of the gateway forwarding device, the first data packet according to the SPI and the corresponding key that are included in the first control information, and the SPI of the first data packet, where the session object is configured to encapsulate or decapsulate a data packet.

With reference to the first possible implementation of the second aspect, in an eighth possible implementation of the second aspect, the gateway forwarding device and the gateway controller function as a TGW, and the first data packet is an uplink data packet;

the receiving, by a gateway forwarding device, a first data packet according to first control information generated by a gateway controller includes:

receiving, by the gateway forwarding device according to the first control information generated by the gateway controller, the first data packet sent by a terminal; and the parsing, by the gateway forwarding device, the first data packet according to the first control information includes:

parsing, by the gateway forwarding device, the first data packet according to a TGW MAC address included in the first control information.

With reference to the eighth possible implementation of the second aspect, in a ninth possible implementation of the second aspect, the receiving, by the gateway forwarding device according to the first control information generated by the gateway controller, the first data packet sent by a terminal includes:

receiving, by an interface object of the gateway forwarding device, the first data packet according to the first control information, where the interface object is used to receive a data packet from another device.

With reference to the first possible implementation of the second aspect, in a tenth possible implementation of the second aspect, the gateway forwarding device and the gateway controller function as an SGW, and the first data packet is a downlink data packet;

the receiving, by a gateway forwarding device, a first data packet according to first control information generated by a gateway controller includes:

receiving, by the gateway forwarding device, the first data packet according to SGW user plane information included in the first control information generated by the gateway controller, where the SGW user plane information is used to define a manner of processing a data packet received from an S5/S8 interface; and the parsing, by the gateway forwarding device, the first data packet according to the first control information includes:

decapsulating, by the gateway forwarding device, the first data packet according to the SGW user plane information.

With reference to the tenth possible implementation of the second aspect, in an eleventh possible implementation of the second aspect, the receiving, by the gateway forwarding device, the first data packet according to SGW user plane information included in the first control information generated by the gateway controller includes:

receiving, by an interface object of the gateway forwarding device, the first data packet according to the SGW user plane information, where the interface object is used to receive a data packet from another device; and the decapsulating, by the gateway forwarding device, the first data packet according to the SGW user plane information includes:

decapsulating, by a link object of the gateway forwarding device, the first data packet according to the SGW user plane information, where the link object is used to decapsulate a data packet.

With reference to the first possible implementation of the second aspect, in a twelfth possible implementation of the second aspect, the gateway forwarding device and the gateway controller function as a PGW, and the first data packet is a downlink data packet;

the receiving, by a gateway forwarding device, a first data packet according to first control information generated by a gateway controller includes:

receiving, by the gateway forwarding device, the first data packet according to terminal user information included in the first control information generated by the gateway controller, where the terminal user information is used to define a manner of processing a data packet received from an SGi interface; and the parsing, by the gateway forwarding device, the first data packet according to the first control information includes:

encapsulating, by the gateway forwarding device, the first data packet according to PGW user plane information included in the first control information, where the PGW user plane information is used to define a manner of processing a data packet received from the SGi interface.

With reference to the twelfth possible implementation of the second aspect, in a thirteenth possible implementation of the second aspect, the receiving, by the gateway forwarding device, the first data packet according to terminal user information included in the first control information generated by the gateway controller includes:

receiving, by an interface object of the gateway forwarding device, the first data packet according to the terminal user information, where the interface object is used to receive a data packet from another device; and the encapsulating, by the gateway forwarding device, the first data packet according to PGW user plane information included in the first control information includes:

encapsulating, by a bearer object of the gateway forwarding device, the first data packet according to the PGW user plane information, where the bearer object is configured to decapsulate or encapsulate a data packet.

With reference to the first possible implementation of the second aspect, in a fourteenth possible implementation of the second aspect, the gateway forwarding device and the gateway controller function as an SGW and a PGW, and the first data packet is a downlink data packet;

the receiving, by a gateway forwarding device, a first data packet according to first control information generated by a gateway controller includes:

receiving, by the gateway forwarding device, the first data packet according to terminal user information included in the first control information generated by the gateway controller, where the terminal user information is used to define a manner of processing a data packet received from an SGi interface; and the parsing, by the gateway forwarding device, the first data packet according to the first control information includes:

encapsulating, by the gateway forwarding device, the first data packet according to eNB user plane information included in the first control information, where the eNB user plane information is used to define a manner of processing a data packet received from the SGi interface.

With reference to the fourteenth possible implementation of the second aspect, in a fifteenth possible implementation of the second aspect, the receiving, by the gateway forwarding device, the first data packet according to terminal user information included in the first control information generated by the gateway controller includes:

receiving, by an interface object of the gateway forwarding device, the first data packet according to the terminal user information, where the interface object is used to receive a data packet from another device; and the encapsulating, by the gateway forwarding device, the first data packet according to eNB user plane information included in the first control information includes:

encapsulating, by a bearer object of the gateway forwarding device, the first data packet according to the eNB user plane information, where the bearer object is configured to decapsulate or encapsulate a data packet.

With reference to the first possible implementation of the second aspect, in a sixteenth possible implementation of the second aspect, the gateway forwarding device and the gateway controller function as an ePDG, and the first data packet is a downlink data packet;

the receiving, by a gateway forwarding device, a first data packet according to first control information generated by a gateway controller includes:

receiving, by the gateway forwarding device, the first data packet according to ePDG user plane information included in the first control information generated by the gateway controller; and the parsing, by the gateway forwarding device, the first data packet according to the first control information includes:

decapsulating, by the gateway forwarding device, the first data packet according to the ePDG user plane information.

With reference to the sixteenth possible implementation of the second aspect, in a seventeenth possible implementation of the second aspect, the receiving, by the gateway forwarding device, the first data packet according to ePDG user plane information included in the first control information generated by the gateway controller includes:

receiving, by an interface object of the gateway forwarding device, the first data packet according to the ePDG user plane information, where the interface object is used to receive a data packet from another device; and the decapsulating, by the gateway forwarding device, the first data packet according to the ePDG user plane information includes:

decapsulating, by a link object of the gateway forwarding device, the first data packet according to the ePDG user plane information, where the link object is used to decapsulate a data packet.

With reference to the first possible implementation of the second aspect, in an eighteenth possible implementation of the second aspect, the gateway forwarding device and the gateway controller function as a TGW, and the first data packet is a downlink data packet;

the receiving, by a gateway forwarding device, a first data packet according to first control information generated by a gateway controller includes:

receiving, by the gateway forwarding device, the first data packet according to TGW user plane information included in the first control information generated by the gateway controller; and the parsing, by the gateway forwarding device, the first data packet according to the first control information includes:

decapsulating, by the gateway forwarding device, the first data packet according to the TGW user plane information.

With reference to the eighteenth possible implementation of the second aspect, in a nineteenth possible implementation of the second aspect, the receiving, by the gateway forwarding device, the first data packet according to TGW user plane information included in the first control information generated by the gateway controller includes:

receiving, by an interface object of the gateway forwarding device, the first data packet according to the TGW user plane information, where the interface object is used to receive a data packet from another device; and the decapsulating, by the gateway forwarding device, the first data packet according to the TGW user plane information includes:

decapsulating, by a link object of the gateway forwarding device, the first data packet according to the TGW user plane information, where the link object is used to decapsulate a data packet.

According to a third aspect, a data packet processing method is provided, including:

encapsulating, by a gateway forwarding device, a second data packet according to second control information generated by a gateway controller, where the second control information is used to indicate a manner of processing the second data packet; and sending, by the gateway forwarding device, the encapsulated second data packet according to the second control information.

With reference to the third aspect, in a first possible implementation of the third aspect, the second data packet is an uplink data packet or a downlink data packet.

With reference to the first possible implementation of the third aspect, in a second possible implementation of the third aspect, the gateway forwarding device and the gateway controller function as an SGW, and the second data packet is an uplink data packet;

the encapsulating, by a gateway forwarding device, a second data packet according to second control information generated by a gateway controller includes:

encapsulating, by the gateway forwarding device, the second data packet according to PGW user plane information included in the second control information generated by the gateway controller, where the PGW user plane information is used to define a manner of processing a data packet to be sent from an S5/S8 interface; and the sending, by the gateway forwarding device, the encapsulated second data packet according to the second control information includes:

sending, by the gateway forwarding device, the encapsulated second data packet according to the PGW user plane information.

With reference to the second possible implementation of the third aspect, in a third possible implementation of the third aspect, the encapsulating, by the gateway forwarding device, the second data packet according to PGW user plane information included in the second control information generated by the gateway controller includes:

encapsulating, by a bearer object of the gateway forwarding device, the second data packet according to the PGW user plane information, where the bearer object is configured to decapsulate or encapsulate a data packet; and the sending, by the gateway forwarding device, the encapsulated second data packet according to the PGW user plane information includes:

sending, by an interface object of the gateway forwarding device, the encapsulated second data packet according to the PGW user plane information, where the interface object is configured to send a data packet to another device.

With reference to the first possible implementation of the third aspect, in a fourth possible implementation of the third aspect, the gateway forwarding device and the gateway controller function as a PGW, and the second data packet is an uplink data packet;

the encapsulating, by a gateway forwarding device, a second data packet according to second control information generated by a gateway controller includes:

encapsulating, by the gateway forwarding device, the second data packet according to Layer 2 Tunneling Protocol L2TP tunnel information included in the second control information generated by the gateway controller, where the L2TP tunnel information is used to define a manner of processing a data packet to be sent from an SGi interface; and the sending, by the gateway forwarding device, the encapsulated second data packet according to the second control information includes:

sending, by the gateway forwarding device, the encapsulated second data packet according to the L2TP tunnel information.

With reference to the fourth possible implementation of the third aspect, in a fifth possible implementation of the third aspect, the encapsulating, by the gateway forwarding device, the second data packet according to L2TP tunnel information included in the second control information generated by the gateway controller includes:

encapsulating, by a link object of the gateway forwarding device, the second data packet according to the L2TP tunnel information, where the link object is used to encapsulate a data packet; and the sending, by the gateway forwarding device, the encapsulated second data packet according to the L2TP tunnel information includes:

sending, by an interface object of the gateway forwarding device, the encapsulated second data packet according to the L2TP tunnel information, where the interface object is configured to send a data packet to another device.

With reference to the first possible implementation of the third aspect, in a sixth possible implementation of the third aspect, the gateway forwarding device and the gateway controller function as an ePDG, and the second data packet is an uplink data packet;

the encapsulating, by a gateway forwarding device, a second data packet according to second control information generated by a gateway controller includes:

encapsulating, by the gateway forwarding device, the second data packet according to PGW user plane information included in the second control information, where the PGW user plane information is used to define a manner of processing a data packet to be sent from an S2b interface; and the sending, by the gateway forwarding device, the encapsulated second data packet according to the second control information includes:

sending, by the gateway forwarding device, the encapsulated second data packet according to the PGW user plane information.

With reference to the sixth possible implementation of the third aspect, in a seventh possible implementation of the third aspect, the encapsulating, by the gateway forwarding device, the second data packet according to PGW user plane information included in the second control information includes:

encapsulating, by a bearer object of the gateway forwarding device, the second data packet according to the PGW user plane information, where the bearer object is configured to decapsulate or encapsulate a data packet; and the sending, by the gateway forwarding device, the encapsulated second data packet according to the PGW user plane information includes:

sending, by an interface object of the gateway forwarding device, the encapsulated second data packet according to the PGW user plane information, where the interface object is configured to send a data packet to another device.

With reference to the first possible implementation of the third aspect, in an eighth possible implementation of the third aspect, the gateway forwarding device and the gateway controller function as a TGW, and the second data packet is an uplink data packet;

the encapsulating, by a gateway forwarding device, a second data packet according to second control information generated by a gateway controller includes:

encapsulating, by the gateway forwarding device, the second data packet according to PGW user plane information included in the second control information, where the PGW user plane information is used to define a manner of processing a data packet to be sent from an S2a interface; and the sending, by the gateway forwarding device, the encapsulated second data packet according to the second control information includes:

sending, by the gateway forwarding device, the encapsulated second data packet according to the PGW user plane information.

With reference to the eighth possible implementation of the third aspect, in a ninth possible implementation of the third aspect, the encapsulating, by the gateway forwarding device, the second data packet according to PGW user plane information included in the second control information includes:

encapsulating, by a bearer object of the gateway forwarding device, the second data packet according to the PGW user plane information, where the bearer object is configured to decapsulate or encapsulate a data packet; and the sending, by the gateway forwarding device, the encapsulated second data packet according to the PGW user plane information includes:

sending, by an interface object of the gateway forwarding device, the encapsulated second data packet according to the PGW user plane information, where the interface object is configured to send a data packet to another device.

With reference to the first possible implementation of the third aspect, in a tenth possible implementation of the third aspect, the gateway forwarding device and the gateway controller function as an SGW, and the second data packet is a downlink data packet;

the encapsulating, by a gateway forwarding device, a second data packet according to second control information generated by a gateway controller includes:

encapsulating, by the gateway forwarding device, the second data packet according to eNB user plane information included in the second control information, where the eNB user plane information is used to define a manner of processing a data packet to be sent from an S1-U interface; and the sending, by the gateway forwarding device, the encapsulated second data packet according to the second control information includes:

sending, by the gateway forwarding device, the encapsulated second data packet according to the eNB user plane information.

With reference to the tenth possible implementation of the third aspect, in an eleventh possible implementation of the third aspect, the encapsulating, by the gateway forwarding device, the second data packet according to eNB user plane information included in the second control information includes:

encapsulating, by a bearer object of the gateway forwarding device, the second data packet according to the eNB user plane information, where the bearer object is configured to decapsulate or encapsulate a data packet; and the sending, by the gateway forwarding device, the encapsulated second data packet according to the eNB user plane information includes:

sending, by an interface object of the gateway forwarding device, the encapsulated second data packet according to the eNB user plane information, where the interface object is configured to send a data packet to another device.

With reference to the first possible implementation of the third aspect, in a twelfth possible implementation of the third aspect, the gateway forwarding device and the gateway controller function as a PGW, and the second data packet is a downlink data packet;

the encapsulating, by a gateway forwarding device, a second data packet according to second control information generated by a gateway controller includes:

encapsulating, by the gateway forwarding device, the second data packet according to SGW user plane information included in the second control information, where the SGW user plane information is used to define a manner of processing a data packet to be sent from an S5/S8 interface; and the sending, by the gateway forwarding device, the encapsulated second data packet according to the second control information includes:

sending, by the gateway forwarding device, the encapsulated second data packet according to the SGW user plane information.

With reference to the twelfth possible implementation of the third aspect, in a thirteenth possible implementation of the third aspect, the encapsulating, by the gateway forwarding device, the second data packet according to serving gateway SGW user plane information included in the second control information includes:

encapsulating, by a bearer object of the gateway forwarding device, the second data packet according to the SGW user plane information, where the bearer object is configured to decapsulate or encapsulate a data packet; and the sending, by the gateway forwarding device, the encapsulated second data packet according to the SGW user plane information includes:

sending, by an interface object of the gateway forwarding device, the encapsulated second data packet according to the SGW user plane information, where the interface object is configured to send a data packet to another device.

With reference to the first possible implementation of the third aspect, in a fourteenth possible implementation of the third aspect, the gateway forwarding device and the gateway controller function as an SGW and a PGW, and the second data packet is a downlink data packet;

the encapsulating, by a gateway forwarding device, a second data packet according to second control information generated by a gateway controller includes:

encapsulating, by the gateway forwarding device, the second data packet according to eNB user plane information included in the second control information, where the eNB user plane information is used to define a manner of processing a data packet to be sent from an S1-U interface; and the sending, by the gateway forwarding device, the encapsulated second data packet according to the second control information includes:

sending, by the gateway forwarding device, the encapsulated second data packet according to the eNB user plane information.

With reference to the fourteenth possible implementation of the third aspect, in a fifteenth possible implementation of the third aspect, the encapsulating, by the gateway forwarding device, the second data packet according to eNB user plane information included in the second control information includes:

encapsulating, by a bearer object of the gateway forwarding device, the second data packet according to the eNB user plane information, where the bearer object is configured to decapsulate or encapsulate a data packet; and the sending, by the gateway forwarding device, the encapsulated second data packet according to the eNB user plane information includes:

sending, by an interface object of the gateway forwarding device, the encapsulated second data packet according to the eNB user plane information, where the interface object is configured to send a data packet to another device.

With reference to the first possible implementation of the third aspect, in a sixteenth possible implementation of the third aspect, the gateway forwarding device and the gateway controller function as an ePDG, and the second data packet is a downlink data packet;

the encapsulating, by a gateway forwarding device, a second data packet according to second control information generated by a gateway controller includes:

encapsulating, by the gateway forwarding device, the second data packet according to an SPI and a corresponding key that are included in the second control information, and encrypting the encapsulated second data packet; and the sending, by the gateway forwarding device, the encapsulated second data packet according to the second control information includes:

sending, by the gateway forwarding device, the encrypted data packet according to the SPI and the corresponding key.

With reference to the sixteenth possible implementation of the third aspect, in a seventeenth possible implementation of the third aspect, the encapsulating, by the gateway forwarding device, the second data packet according to an SPI and a corresponding key that are included in the second control information, and encrypting the encapsulated second data packet includes:

encapsulating, by a session object of the gateway forwarding device, the second data packet according to the SPI and the corresponding key, and encrypting the encapsulated second data packet, where the session object is configured to encapsulate or decapsulate, and encrypt a data packet; and the sending, by the gateway forwarding device, the encrypted data packet according to the SPI and the corresponding key includes:

sending, by an interface object of the gateway forwarding device, the encrypted data packet according to the SPI and the corresponding key, where the interface object is configured to send a data packet to another device.

With reference to the first possible implementation of the third aspect, in an eighteenth possible implementation of the third aspect, the gateway forwarding device and the gateway controller function as a TGW, and the second data packet is a downlink data packet;

the encapsulating, by a gateway forwarding device, a second data packet according to second control information generated by a gateway controller includes:

encapsulating, by the gateway forwarding device, the second data packet according to a MAC address of a terminal included in the second control information; and the sending, by the gateway forwarding device, the encapsulated second data packet according to the second control information includes:

sending, by the gateway forwarding device, the encapsulated second data packet according to the MAC address of the terminal.

According to a fourth aspect, a gateway forwarding device is provided, including:

a receiving module, configured to receive a first data packet according to first control information generated by a gateway controller, where the first control information is used to indicate a manner of processing the first data packet; and a parsing module, configured to parse the first data packet according to the first control information.

With reference to the fourth aspect, in a first possible implementation of the fourth aspect, the first data packet is an uplink data packet or a downlink data packet.

With reference to the first possible implementation of the fourth aspect, in a second possible implementation of the fourth aspect, the gateway forwarding device and the gateway controller function as an SGW, or the gateway forwarding device and the gateway controller function as an SGW and a PGW, and the first data packet is an uplink data packet;

the receiving module is configured to:

receive the first data packet according to SGW user plane information included in the first control information generated by the gateway controller, where the SGW user plane information is used to define a manner of processing a data packet received from an S1-U interface; and the parsing module is configured to:

decapsulate the first data packet according to the SGW user plane information.

With reference to the second possible implementation of the fourth aspect, in a third possible implementation of the fourth aspect, the receiving module is configured to:

receive the first data packet according to the SGW user plane information by using an interface object, where the interface object is used to receive a data packet from another device; and the parsing module is configured to:

decapsulate the first data packet according to the SGW user plane information by using a link object, where the link object is used to decapsulate a data packet.

With reference to the first possible implementation of the fourth aspect, in a fourth possible implementation of the fourth aspect, the gateway forwarding device and the gateway controller function as a PGW, and the first data packet is an uplink data packet;

the receiving module is configured to:

receive the first data packet according to PGW user plane information included in the first control information generated by the gateway controller, where the PGW user plane information is used to define a manner of processing a data packet received from an S5/S8 interface; and the parsing module is configured to:

decapsulate the first data packet according to the PGW user plane information.

With reference to the fourth possible implementation of the fourth aspect, in a fifth possible implementation of the fourth aspect, the receiving module is configured to:

receive the first data packet according to the PGW user plane information by using an interface object, where the interface object is used to receive a data packet from another device; and the parsing module is configured to:
decapsulate the first data packet according to the PGW user plane information by using a link object, where the link object is used to decapsulate a data packet.

With reference to the first possible implementation of the fourth aspect, in a sixth possible implementation of the fourth aspect, the gateway forwarding device and the gateway controller function as an ePDG, and the first data packet is an uplink data packet;
the receiving module is configured to:
receive, according to the first control information generated by the gateway controller, the first data packet sent by a terminal; and
the parsing module is configured to:
decrypt the first data packet according to an SPI and a corresponding key that are included in the first control information and an SPI of the first data packet.

With reference to the sixth possible implementation of the fourth aspect, in a seventh possible implementation of the fourth aspect,
the receiving module is configured to:
receive the first data packet according to the first control information by using an interface object, where the interface object is used to receive a data packet from another device; and
the parsing module is configured to:
decrypt, by using a session object, the first data packet according to the SPI and the corresponding key that are included in the first control information and the SPI of the first data packet, where the session object is configured to encapsulate or decapsulate a data packet.

With reference to the first possible implementation of the fourth aspect, in an eighth possible implementation of the fourth aspect, the gateway forwarding device and the gateway controller function as a TGW, and the first data packet is an uplink data packet;
the receiving module is configured to:
receive, according to the first control information generated by the gateway controller, the first data packet sent by a terminal; and
the parsing module is configured to:
parse the first data packet according to a TGW MAC address included in the first control information.

With reference to the eighth possible implementation of the fourth aspect, in a ninth possible implementation of the fourth aspect, the receiving module is configured to receive the first data packet according to the first control information by using an interface object, where the interface object is used to receive a data packet from another device.

With reference to the first possible implementation of the fourth aspect, in a tenth possible implementation of the fourth aspect, the gateway forwarding device and the gateway controller function as an SGW, and the first data packet is a downlink data packet;
the receiving module is configured to:
receive the first data packet according to SGW user plane information included in the first control information generated by the gateway controller, where the SGW user plane information is used to define a manner of processing a data packet received from an S5/S8 interface; and
the parsing module is configured to:
decapsulate the first data packet according to the SGW user plane information.

With reference to the tenth possible implementation of the fourth aspect, in an eleventh possible implementation of the fourth aspect,
the receiving module is configured to:
receive the first data packet according to the SGW user plane information by using an interface object, where the interface object is used to receive a data packet from another device; and
the parsing module is configured to:
decapsulate the first data packet according to the SGW user plane information by using a link object, where the link object is used to decapsulate a data packet.

With reference to the first possible implementation of the fourth aspect, in a twelfth possible implementation of the fourth aspect, the gateway forwarding device and the gateway controller function as a PGW, and the first data packet is a downlink data packet;
the receiving module is configured to:
receive the first data packet according to terminal user information included in the first control information generated by the gateway controller, where the terminal user information is used to define a manner of processing a data packet received from an SGi interface; and
the parsing module is configured to:
encapsulate the first data packet according to PGW user plane information included in the first control information, where the PGW user plane information is used to define a manner of processing a data packet received from the SGi interface.

With reference to the twelfth possible implementation of the fourth aspect, in a thirteenth possible implementation of the fourth aspect,
the receiving module is configured to:
receive the first data packet according to the terminal user information by using an interface object, where the interface object is used to receive a data packet from another device; and
the parsing module is configured to:
encapsulate the first data packet according to the PGW user plane information by using a bearer object, where the bearer object is configured to decapsulate or encapsulate a data packet.

With reference to the first possible implementation of the fourth aspect, in a fourteenth possible implementation of the fourth aspect, the gateway forwarding device and the gateway controller function as an SGW and a PGW, and the first data packet is a downlink data packet;
the receiving module is configured to:
receive the first data packet according to terminal user information included in the first control information generated by the gateway controller, where the terminal user information is used to define a manner of processing a data packet received from an SGi interface; and
the parsing module is configured to:
encapsulate the first data packet according to eNB user plane information included in the first control information, where the eNB user plane information is used to define a manner of processing a data packet received from the SGi interface.

With reference to the fourteenth possible implementation of the fourth aspect, in a fifteenth possible implementation of the fourth aspect,
the receiving module is configured to:
receive the first data packet according to the terminal user information by using an interface object, where the interface object is used to receive a data packet from another device; and the parsing module is configured to:

encapsulate the first data packet according to the eNB user plane information by using a bearer object, where the bearer object is configured to decapsulate or encapsulate a data packet.

With reference to the first possible implementation of the fourth aspect, in a sixteenth possible implementation of the fourth aspect, the gateway forwarding device and the gateway controller function as an ePDG, and the first data packet is a downlink data packet;

the receiving module is configured to:

receive the first data packet according to ePDG user plane information included in the first control information generated by the gateway controller; and the parsing module is configured to:

decapsulate the first data packet according to the ePDG user plane information.

With reference to the sixteenth possible implementation of the fourth aspect, in a seventeenth possible implementation of the fourth aspect, the receiving module is configured to:

receive the first data packet according to the ePDG user plane information by using an interface object, where the interface object is used to receive a data packet from another device; and the parsing module is configured to:

decapsulate the first data packet according to the ePDG user plane information by using a link object, where the link object is used to decapsulate a data packet.

With reference to the first possible implementation of the fourth aspect, in an eighteenth possible implementation of the fourth aspect, the gateway forwarding device and the gateway controller function as a TGW, and the first data packet is a downlink data packet;

the receiving module is configured to:

receive the first data packet according to TGW user plane information included in the first control information generated by the gateway controller; and the parsing module is configured to:

decapsulate the first data packet according to the TGW user plane information.

With reference to the eighteenth possible implementation of the fourth aspect, in a nineteenth possible implementation of the fourth aspect, the receiving module is configured to:

receive the first data packet according to the TGW user plane information by using an interface object, where the interface object is used to receive a data packet from another device; and the parsing module is configured to:

decapsulate the first data packet according to the TGW user plane information by using a link object, where the link object is used to decapsulate a data packet.

According to a fifth aspect, a gateway forwarding device is provided, including:

an encapsulation module, configured to encapsulate a second data packet according to second control information generated by a gateway controller, where the second control information is used to indicate a manner of processing the second data packet; and a sending module, configured to send the encapsulated second data packet according to the second control information.

With reference to the fifth aspect, in a first possible implementation of the fifth aspect, the second data packet is an uplink data packet or a downlink data packet.

With reference to the first possible implementation of the fifth aspect, in a second possible implementation of the fifth aspect, the gateway forwarding device and the gateway controller function as an SGW, and the second data packet is an uplink data packet;

the encapsulation module is configured to:

encapsulate the second data packet according to PGW user plane information included in the second control information generated by the gateway controller, where the PGW user plane information is used to define a manner of processing a data packet to be sent from an S5/S8 interface; and the sending module is configured to:

send the encapsulated second data packet according to the PGW user plane information.

With reference to the second possible implementation of the fifth aspect, in a third possible implementation of the fifth aspect, the encapsulation module is configured to:

encapsulate the second data packet according to the PGW user plane information by using a bearer object, where the bearer object is configured to decapsulate or encapsulate a data packet; and the sending module is configured to:

send the encapsulated second data packet according to the PGW user plane information by using an interface object, where the interface object is configured to send a data packet to another device.

With reference to the first possible implementation of the fifth aspect, in a fourth possible implementation of the fifth aspect, the gateway forwarding device and the gateway controller function as a PGW, and the second data packet is an uplink data packet;

the encapsulation module is configured to:

encapsulate the second data packet according to L2TP tunnel information included in the second control information generated by the gateway controller, where the L2TP tunnel information is used to define a manner of processing a data packet to be sent from an SGi interface; and the sending module is configured to:

send the encapsulated second data packet according to the L2TP tunnel information.

With reference to the fourth possible implementation of the fifth aspect, in a fifth possible implementation of the fifth aspect, the encapsulation module is configured to:

encapsulate the second data packet according to the L2TP tunnel information by using a link object, where the link object is used to encapsulate a data packet; and the sending module is configured to:

send the encapsulated second data packet according to the L2TP tunnel information by using an interface object, where the interface object is configured to send a data packet to another device.

With reference to the first possible implementation of the fifth aspect, in a sixth possible implementation of the fifth aspect, the gateway forwarding device and the gateway controller function as an ePDG, and the second data packet is an uplink data packet;

the encapsulation module is configured to:

encapsulate the second data packet according to PGW user plane information included in the second control information, where the PGW user plane information is used to define a manner of processing a data packet to be sent from an S2b interface; and the sending module is configured to:

send the encapsulated second data packet according to the PGW user plane information.

With reference to the sixth possible implementation of the fifth aspect, in a seventh possible implementation of the fifth aspect,
the encapsulation module is configured to:
encapsulate the second data packet according to the PGW user plane information by using a bearer object, where the bearer object is configured to decapsulate or encapsulate a data packet; and
the sending module is configured to:
send the encapsulated second data packet according to the PGW user plane information by using an interface object, where the interface object is configured to send a data packet to another device.

With reference to the first possible implementation of the fifth aspect, in an eighth possible implementation of the fifth aspect, the gateway forwarding device and the gateway controller function as a TGW, and the second data packet is an uplink data packet;
the encapsulation module is configured to:
encapsulate the second data packet according to PGW user plane information included in the second control information, where the PGW user plane information is used to define a manner of processing a data packet to be sent from an S2a interface; and
the sending module is configured to:
send the encapsulated second data packet according to the PGW user plane information.

With reference to the eighth possible implementation of the fifth aspect, in a ninth possible implementation of the fifth aspect,
the encapsulation module is configured to:
encapsulate the second data packet according to the PGW user plane information by using a bearer object, where the bearer object is configured to decapsulate or encapsulate a data packet; and
the sending module is configured to:
send the encapsulated second data packet according to the PGW user plane information by using an interface object, where the interface object is configured to send a data packet to another device.

With reference to the first possible implementation of the fifth aspect, in a tenth possible implementation of the fifth aspect, the gateway forwarding device and the gateway controller function as an SGW, and the second data packet is a downlink data packet;
the encapsulation module is configured to:
encapsulate the second data packet according to eNB user plane information included in the second control information, where the eNB user plane information is used to define a manner of processing a data packet to be sent from an S1-U interface; and
the sending module is configured to:
send the encapsulated second data packet according to the eNB user plane information.

With reference to the tenth possible implementation of the fifth aspect, in an eleventh possible implementation of the fifth aspect,
the encapsulation module is configured to:
encapsulate the second data packet according to the eNB user plane information by using a bearer object, where the bearer object is configured to decapsulate or encapsulate a data packet; and
the sending module is configured to:
send the encapsulated second data packet according to the eNB user plane information by using an interface object, where the interface object is configured to send a data packet to another device.

With reference to the first possible implementation of the fifth aspect, in a twelfth possible implementation of the fifth aspect, the gateway forwarding device and the gateway controller function as a PGW, and the second data packet is a downlink data packet;
the encapsulation module is configured to:
encapsulate the second data packet according to SGW user plane information included in the second control information, where the SGW user plane information is used to define a manner of processing a data packet to be sent from an S5/S8 interface; and
the sending module is configured to:
send the encapsulated second data packet according to the SGW user plane information.

With reference to the twelfth possible implementation of the fifth aspect, in a thirteenth possible implementation of the fifth aspect,
the encapsulation module is configured to:
encapsulate the second data packet according to the SGW user plane information by using a bearer object, where the bearer object is configured to decapsulate or encapsulate a data packet; and
the sending module is configured to:
send the encapsulated second data packet according to the SGW user plane information by using an interface object, where the interface object is configured to send a data packet to another device.

With reference to the first possible implementation of the fifth aspect, in a fourteenth possible implementation of the fifth aspect, the gateway forwarding device and the gateway controller function as an SGW and a PGW, and the second data packet is a downlink data packet;
the encapsulation module is configured to:
encapsulate the second data packet according to eNB user plane information included in the second control information, where the eNB user plane information is used to define a manner of processing a data packet to be sent from an S1-U interface; and
the sending module is configured to:
send the encapsulated second data packet according to the eNB user plane information.

With reference to the fourteenth possible implementation of the fifth aspect, in a fifteenth possible implementation of the fifth aspect,
the encapsulation module is configured to:
encapsulate the second data packet according to the eNB user plane information by using a bearer object, where the bearer object is configured to decapsulate or encapsulate a data packet; and
the sending module is configured to:
send the encapsulated second data packet according to the eNB user plane information by using an interface object, where the interface object is configured to send a data packet to another device.

With reference to the first possible implementation of the fifth aspect, in a sixteenth possible implementation of the fifth aspect, the gateway forwarding device and the gateway controller function as an ePDG, and the second data packet is a downlink data packet;
the encapsulation module is configured to:
encapsulate the second data packet according to an SPI and a corresponding key that are included in the second control information, and encrypt the encapsulated second data packet; and
the sending module is configured to:
send the encrypted data packet according to the SPI and the corresponding key.

With reference to the sixteenth possible implementation of the fifth aspect, in a seventeenth possible implementation of the fifth aspect, the encapsulation module is configured to:

encapsulate the second data packet according to the SPI and the corresponding key by using a session object; and encrypt the encapsulated second data packet, where the session object is configured to encapsulate or decapsulate, and encrypt a data packet; and the sending module is configured to:

send the encrypted data packet according to the SPI and the corresponding key by using an interface object, where the interface object is configured to send a data packet to another device.

With reference to the first possible implementation of the fifth aspect, in an eighteenth possible implementation of the fifth aspect, the gateway forwarding device and the gateway controller function as a TGW, and the second data packet is a downlink data packet;

the encapsulation module is configured to:

encapsulate the second data packet according to a MAC address of a terminal included in the second control information; and the sending module is configured to:

send the encapsulated second data packet according to the MAC address of the terminal.

According to a sixth aspect, a gateway forwarding device is provided, including:

a memory, configured to store an instruction;

a receiver, configured to receive a first data packet according to first control information generated by a gateway controller, where the first control information is used to indicate a manner of processing the first data packet; and a processor, configured to execute the instruction, so as to parse the first data packet according to the first control information.

With reference to the sixth aspect, in a first possible implementation of the sixth aspect, the first data packet is an uplink data packet or a downlink data packet.

With reference to the first possible implementation of the sixth aspect, in a second possible implementation of the sixth aspect, the gateway forwarding device and the gateway controller function as an SGW, or the gateway forwarding device and the gateway controller function as an SGW and a PGW, and the first data packet is an uplink data packet;

the receiver is configured to:

receive the first data packet according to SGW user plane information included in the first control information generated by the gateway controller, where the SGW user plane information is used to define a manner of processing a data packet received from an S1-U interface; and the processor is configured to:

decapsulate the first data packet according to the SGW user plane information.

With reference to the second possible implementation of the sixth aspect, in a third possible implementation of the sixth aspect, the receiver is configured to:

receive the first data packet according to the SGW user plane information by using an interface object, where the interface object is used to receive a data packet from another device; and the processor is configured to:

decapsulate the first data packet according to the SGW user plane information by using a link object, where the link object is used to decapsulate a data packet.

With reference to the first possible implementation of the sixth aspect, in a fourth possible implementation of the sixth aspect, the gateway forwarding device and the gateway controller function as a PGW, and the first data packet is an uplink data packet;

the receiver is configured to:

receive the first data packet according to PGW user plane information included in the first control information generated by the gateway controller, where the PGW user plane information is used to define a manner of processing a data packet received from an S5/S8 interface; and the processor is configured to:

decapsulate the first data packet according to the PGW user plane information.

With reference to the fourth possible implementation of the sixth aspect, in a fifth possible implementation of the sixth aspect, the receiver is configured to:

receive the first data packet according to the PGW user plane information by using an interface object, where the interface object is used to receive a data packet from another device; and the processor is configured to:

decapsulate the first data packet according to the PGW user plane information by using a link object, where the link object is used to decapsulate a data packet.

With reference to the first possible implementation of the sixth aspect, in a sixth possible implementation of the sixth aspect, the gateway forwarding device and the gateway controller function as an ePDG and the first data packet is an uplink data packet;

the receiver is configured to:

receive, according to the first control information generated by the gateway controller, the first data packet sent by a terminal; and the processor is configured to:

decrypt the first data packet according to an SPI and a corresponding key that are included in the first control information and an SPI of the first data packet.

With reference to the sixth possible implementation of the sixth aspect, in a seventh possible implementation of the sixth aspect, the receiver is configured to:

receive the first data packet according to the first control information by using an interface object, where the interface object is used to receive a data packet from another device; and the processor is configured to:

decrypt, by using a session object, the first data packet according to the SPI and the corresponding key that are included in the first control information and the SPI of the first data packet, where the session object is configured to encapsulate or decapsulate a data packet.

With reference to the first possible implementation of the sixth aspect, in an eighth possible implementation of the sixth aspect, the gateway forwarding device and the gateway controller function as a TGW, and the first data packet is an uplink data packet;

the receiver is configured to:

receive, according to the first control information generated by the gateway controller, the first data packet sent by a terminal; and the processor is configured to:

parse the first data packet according to a TGW MAC address included in the first control information.

With reference to the eighth possible implementation of the sixth aspect, in a ninth possible implementation of the sixth aspect, the receiver is configured to:

receive the first data packet according to the first control information by using an interface object, where the interface object is used to receive a data packet from another device.

With reference to the first possible implementation of the sixth aspect, in a tenth possible implementation of the sixth aspect, the gateway forwarding device and the gateway controller function as an SGW, and the first data packet is a downlink data packet;

the receiver is configured to:

receive the first data packet according to SGW user plane information included in the first control information generated by the gateway controller, where the SGW user plane information is used to define a manner of processing a data packet received from an S5/S8 interface; and the processor is configured to:

decapsulate the first data packet according to the SGW user plane information.

With reference to the tenth possible implementation of the sixth aspect, in an eleventh possible implementation of the sixth aspect, the receiver is configured to:

receive the first data packet according to the SGW user plane information by using an interface object, where the interface object is used to receive a data packet from another device; and the processor is configured to:

decapsulate the first data packet according to the SGW user plane information by using a link object, where the link object is used to decapsulate a data packet.

With reference to the first possible implementation of the sixth aspect, in a twelfth possible implementation of the sixth aspect, the gateway forwarding device and the gateway controller function as a PGW, and the first data packet is a downlink data packet;

the receiver is configured to:

receive the first data packet according to terminal user information included in the first control information generated by the gateway controller, where the terminal user information is used to define a manner of processing a data packet received from an SGi interface; and the processor is configured to:

encapsulate the first data packet according to PGW user plane information included in the first control information, where the PGW user plane information is used to define a manner of processing a data packet received from the SGi interface.

With reference to the twelfth possible implementation of the sixth aspect, in a thirteenth possible implementation of the sixth aspect, the receiver is configured to:

receive the first data packet according to the terminal user information by using an interface object, where the interface object is used to receive a data packet from another device; and the processor is configured to:

encapsulate the first data packet according to the PGW user plane information by using a bearer object, where the bearer object is configured to decapsulate or encapsulate a data packet.

With reference to the first possible implementation of the sixth aspect, in a fourteenth possible implementation of the sixth aspect, the gateway forwarding device and the gateway controller function as an SGW and a PGW, and the first data packet is a downlink data packet;

the receiver is configured to:

receive the first data packet according to terminal user information included in the first control information generated by the gateway controller, where the terminal user information is used to define a manner of processing a data packet received from an SGi interface; and the processor is configured to:

encapsulate the first data packet according to eNB user plane information included in the first control information, where the eNB user plane information is used to define a manner of processing a data packet received from the SGi interface.

With reference to the fourteenth possible implementation of the sixth aspect, in a fifteenth possible implementation of the sixth aspect, the receiver is configured to:

receive the first data packet according to the terminal user information by using an interface object, where the interface object is used to receive a data packet from another device; and the processor is configured to:

encapsulate the first data packet according to the eNB user plane information by using a bearer object, where the bearer object is configured to decapsulate or encapsulate a data packet.

With reference to the first possible implementation of the sixth aspect, in a sixteenth possible implementation of the sixth aspect, the gateway forwarding device and the gateway controller function as an ePDG and the first data packet is a downlink data packet;

the receiver is configured to:

receive the first data packet according to ePDG user plane information included in the first control information generated by the gateway controller; and the processor is configured to:

decapsulate the first data packet according to the ePDG user plane information.

With reference to the sixteenth possible implementation of the sixth aspect, in a seventeenth possible implementation of the sixth aspect, the receiver is configured to:

receive the first data packet according to the ePDG user plane information by using an interface object, where the interface object is used to receive a data packet from another device; and the processor is configured to:

decapsulate the first data packet according to the ePDG user plane information by using a link object, where the link object is used to decapsulate a data packet.

With reference to the first possible implementation of the sixth aspect, in an eighteenth possible implementation of the sixth aspect, the gateway forwarding device and the gateway controller function as a TGW, and the first data packet is a downlink data packet;

the receiver is configured to:

receive the first data packet according to TGW user plane information included in the first control information generated by the gateway controller; and the processor is configured to:

decapsulate the first data packet according to the TGW user plane information.

With reference to the eighteenth possible implementation of the sixth aspect, in a nineteenth possible implementation of the sixth aspect, the receiver is configured to:
receive the first data packet according to the TGW user plane information by using an interface object, where the interface object is used to receive a data packet from another device; and
the processor is configured to:
decapsulate the first data packet according to the TGW user plane information by using a link object, where the link object is used to decapsulate a data packet.

According to a seventh aspect, a gateway forwarding device is provided, including:
a memory, configured to store an instruction;
a processor, configured to execute the instruction, so as to: encapsulate a second data packet according to second control information generated by a gateway controller, where the second control information is used to indicate a manner of processing the second data packet; and send the encapsulated second data packet according to the second control information by using a transmitter.

With reference to the seventh aspect, in a first possible implementation of the seventh aspect, the second data packet is an uplink data packet or a downlink data packet.

With reference to the first possible implementation of the seventh aspect, in a second possible implementation of the seventh aspect, the gateway forwarding device and the gateway controller function as an SGW, and the second data packet is an uplink data packet;
the processor is configured to:
encapsulate the second data packet according to PGW user plane information included in the second control information generated by the gateway controller, where the PGW user plane information is used to define a manner of processing a data packet to be sent from an S5/S8 interface; and send the encapsulated second data packet according to the PGW user plane information by using the transmitter.

With reference to the second possible implementation of the seventh aspect, in a third possible implementation of the seventh aspect, the processor is configured to:
encapsulate the second data packet according to the PGW user plane information by using a bearer object, where the bearer object is configured to decapsulate or encapsulate a data packet; and send the encapsulated second data packet according to the PGW user plane information by using an interface object and the transmitter, where the interface object is configured to send a data packet to another device.

With reference to the first possible implementation of the seventh aspect, in a fourth possible implementation of the seventh aspect, the gateway forwarding device and the gateway controller function as a PGW, and the second data packet is an uplink data packet;
the processor is configured to:
encapsulate the second data packet according to L2TP tunnel information included in the second control information generated by the gateway controller, where the L2TP tunnel information is used to define a manner of processing a data packet to be sent from an SGi interface; and send the encapsulated second data packet according to the L2TP tunnel information by using the transmitter.

With reference to the fourth possible implementation of the seventh aspect, in a fifth possible implementation of the seventh aspect, the processor is configured to:
encapsulate the second data packet according to the L2TP tunnel information by using a link object, where the link object is used to encapsulate a data packet; and send the encapsulated second data packet according to the L2TP tunnel information by using an interface object and the transmitter, where the interface object is configured to send a data packet to another device.

With reference to the first possible implementation of the seventh aspect, in a sixth possible implementation of the seventh aspect, the gateway forwarding device and the gateway controller function as an ePDG, and the second data packet is an uplink data packet;
the processor is configured to:
encapsulate the second data packet according to PGW user plane information included in the second control information, where the PGW user plane information is used to define a manner of processing a data packet to be sent from an S2b interface; and send the encapsulated second data packet according to the PGW user plane information by using the transmitter.

With reference to the sixth possible implementation of the seventh aspect, in a seventh possible implementation of the seventh aspect, the processor is configured to:
encapsulate the second data packet according to the PGW user plane information by using a bearer object, where the bearer object is configured to decapsulate or encapsulate a data packet; and send the encapsulated second data packet according to the PGW user plane information by using an interface object and the transmitter, where the interface object is configured to send a data packet to another device.

With reference to the first possible implementation of the seventh aspect, in an eighth possible implementation of the seventh aspect, the gateway forwarding device and the gateway controller function as a TGW, and the second data packet is an uplink data packet;
the processor is configured to:
encapsulate the second data packet according to PGW user plane information included in the second control information, where the PGW user plane information is used to define a manner of processing a data packet to be sent from an S2a interface; and send the encapsulated second data packet according to the PGW user plane information by using the transmitter.

With reference to the eighth possible implementation of the seventh aspect, in a ninth possible implementation of the seventh aspect, the processor is configured to:
encapsulate the second data packet according to the PGW user plane information by using a bearer object, where the bearer object is configured to decapsulate or encapsulate a data packet; and send the encapsulated second data packet according to the PGW user plane information by using an interface object and the transmitter, where the interface object is configured to send a data packet to another device.

With reference to the first possible implementation of the seventh aspect, in a tenth possible implementation of the seventh aspect, the gateway forwarding device and the gateway controller function as an SGW, and the second data packet is a downlink data packet;
the processor is configured to:
encapsulate the second data packet according to eNB user plane information included in the second control information, where the eNB user plane information is used to define a manner of processing a data packet to be sent from an S1-U interface; and send the encapsulated second data packet according to the eNB user plane information by using the transmitter.

With reference to the tenth possible implementation of the seventh aspect, in an eleventh possible implementation of the seventh aspect, the processor is configured to:
encapsulate the second data packet according to the eNB user plane information by using a bearer object, where the bearer object is configured to decapsulate or encapsulate a data packet; and send the encapsulated second data packet according to the eNB user plane information by using an interface object and the transmitter, where the interface object is configured to send a data packet to another device.

With reference to the first possible implementation of the seventh aspect, in a twelfth possible implementation of the seventh aspect, the gateway forwarding device and the gateway controller function as a PGW, and the second data packet is a downlink data packet;

the processor is configured to:

encapsulate the second data packet according to SGW user plane information included in the second control information, where the SGW user plane information is used to define a manner of processing a data packet to be sent from an S5/S8 interface; and send the encapsulated second data packet according to the SGW user plane information by using the transmitter.

With reference to the twelfth possible implementation of the seventh aspect, in a thirteenth possible implementation of the seventh aspect, the processor is configured to:

encapsulate the second data packet according to the SGW user plane information by using a bearer object, where the bearer object is configured to decapsulate or encapsulate a data packet; and send the encapsulated second data packet according to the SGW user plane information by using an interface object and the transmitter, where the interface object is configured to send a data packet to another device.

With reference to the first possible implementation of the seventh aspect, in a fourteenth possible implementation of the seventh aspect, the gateway forwarding device and the gateway controller function as an SGW and a PGW, and the second data packet is a downlink data packet;

the processor is configured to:

encapsulate the second data packet according to eNB user plane information included in the second control information, where the eNB user plane information is used to define a manner of processing a data packet to be sent from an S1-U interface; and send the encapsulated second data packet according to the eNB user plane information by using the transmitter.

With reference to the fourteenth possible implementation of the seventh aspect, in a fifteenth possible implementation of the seventh aspect, the processor is configured to:

encapsulate the second data packet according to the eNB user plane information by using a bearer object, where the bearer object is configured to decapsulate or encapsulate a data packet; and send the encapsulated second data packet according to the eNB user plane information by using an interface object and the transmitter, where the interface object is configured to send a data packet to another device.

With reference to the first possible implementation of the seventh aspect, in a sixteenth possible implementation of the seventh aspect, the gateway forwarding device and the gateway controller function as an ePDG, and the second data packet is a downlink data packet;

the processor is configured to:

encapsulate the second data packet according to an SPI and a corresponding key that are included in the second control information; encrypt the encapsulated second data packet; and send the encrypted data packet according to the SPI and the corresponding key by using the transmitter.

With reference to the sixteenth possible implementation of the seventh aspect, in a seventeenth possible implementation of the seventh aspect, the processor is configured to:

encapsulate the second data packet according to the SPI and the corresponding key by using a session object; encrypt the encapsulated second data packet, where the session object is configured to encapsulate or decapsulate, and encrypt a data packet; and send the encrypted data packet according to the SPI and the corresponding key by using an interface and the transmitter, where the interface object is configured to send a data packet to another device.

With reference to the first possible implementation of the seventh aspect, in an eighteenth possible implementation of the seventh aspect, the gateway forwarding device and the gateway controller function as a TGW, and the second data packet is a downlink data packet;

the processor is configured to:

encapsulate the second data packet according to a MAC address of a terminal included in the second control information; and send the encapsulated second data packet according to the MAC address of the terminal by using the transmitter.

The embodiments of the present invention provide a gateway system. In the gateway system, a control plane is separated from a forwarding plane. A gateway controller is configured to complete a control function, and may control respective generation of control information (that is, control information corresponding to different network standards) for data packets of multiple different protocol types. A gateway forwarding device is responsible for forwarding, and may be controlled by the gateway controller to receive and send data packets of various protocol types (that is, receive and send data packets corresponding to different network standards), for example, to receive and send a GTP data packet or a GRE data packet, so that the gateway system can be applicable to various network standards without deploying different gateways for multiple different network standards, and system overheads are reduced. In addition, in a multi-standard access architecture, only one or few such gateway systems may need to be accessed without accessing multiple different gateways, thereby simplifying a network topology structure, and facilitating network maintenance.

DESCRIPTION OF EMBODIMENTS

To make objectives, technical solutions, and advantages of embodiments of the present invention clearer, the following clearly describes technical solutions in embodiments of the present invention with reference to the accompanying drawings. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
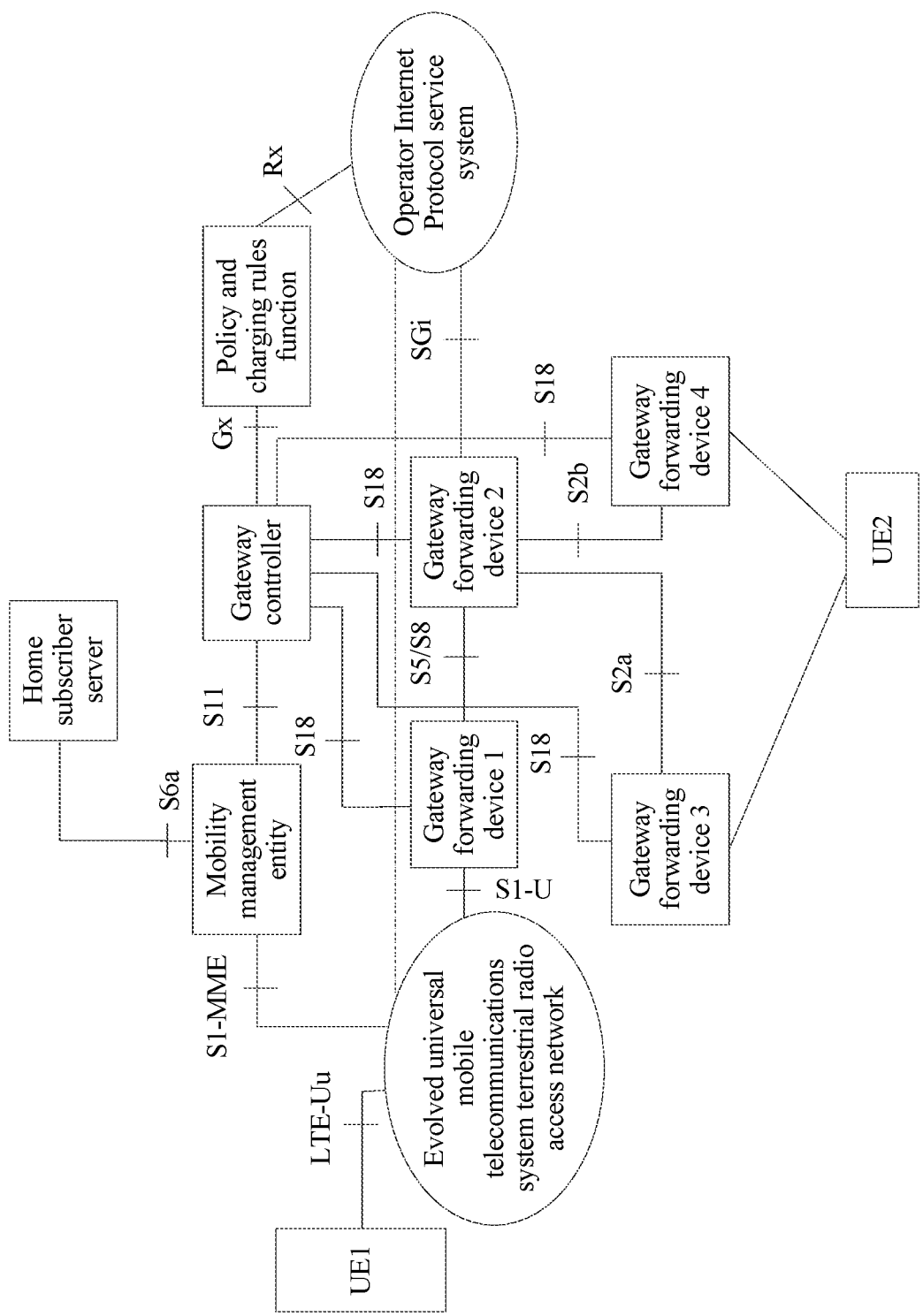
FIG. 1 is a diagram of a distributed gateway architecture according to an embodiment of the present invention.

Referring to FIG. 1, a distributed gateway architecture in an embodiment of the present invention is first described. In FIG. 1, a gateway may be considered as a gateway system, and each gateway system includes two parts: a gateway controller and a gateway forwarding device.

FIG. 1 shows four gateway forwarding devices. The four gateway forwarding devices respectively correspond to an SGW (gateway forwarding device 1 in FIG. 1) in a 3GPP access scenario, a PGW (gateway forwarding device 2 in FIG. 1) in the 3GPP access scenario, a TGW (gateway forwarding device 3 in FIG. 1) in a trusted non-3GPP access scenario, and an ePDG (gateway forwarding device 4 in FIG. 1) in an untrusted non-3GPP access scenario. The four gateway forwarding devices correspond to different network standards, and usually do not appear at the same time, that is, a gateway forwarding device may be selected according to a corresponding network standard. For ease of description, all these gateway forwarding devices are shown in FIG. 1.

FIG. 1 shows only one gateway controller, because a connection relationship of a gateway controller is basically fixed regardless of a corresponding network standard. A connection relationship of a gateway forwarding device may be different in different network standards. Therefore, four gateway forwarding devices are described in FIG. 1, and only one gateway controller is drawn.

In FIG. 1, user equipment (UE) is connected to an evolved universal mobile telecommunications system terrestrial radio access network (E-UTRAN), for example, may be connected to the E-UTRAN by using an Long Term Evolution (LTE)-Uu interface. The E-UTRAN is separately connected to the gateway forwarding device 1 and a mobility management entity (MME). For example, the E-UTRAN is connected to the MME by using an S1-MME interface, and connected to the gateway forwarding device 1 by using an S1-U interface. The MME is connected to an home subscriber server (HSS) by using an S6a interface, and connected to the gateway controller by using an S11 interface.

The gateway controller is connected to a policy and charging rules function (PCRF) by using a Gx interface. In addition, the gateway controller is connected to the gateway forwarding device 1, the gateway forwarding device 2, the gateway forwarding device 3, and the gateway forwarding device 4 by using an S18 interface. The PCRF is connected to an operator Internet Protocol (IP) service system (for example, an IP multimedia subsystem (IMS) or a packet-switched streaming service (PSS)) by using an Rx interface, and the gateway forwarding device 2 is connected to the operator IP service system by using an SGi interface. The gateway forwarding device 2 is further connected to the gateway forwarding device 3 by using an S2a interface, connected to the gateway forwarding device 4 by using an S2b interface, and connected to the gateway forwarding device 1 by using an S5/S8 interface. The gateway forwarding device 3 and the gateway forwarding device 4 each are connected to user equipment 2.

In this embodiment of the present invention, it is equivalent to that a conventional gateway is converted into a gateway system. The gateway system may include a gateway controller (GW-C) and a gateway forwarding device (GW-U). The GW-C implements a gateway control plane function, and the GW-U implements a gateway user plane function. S18 is used as a name of an interface between the GW-C and the GW-U, or another interface name may be used, and this is not limited in this embodiment of the present invention. In addition, GTP may be used as a transmission protocol for the S18 interface in this embodiment of the present invention, or another protocol may be used as a transmission protocol for the S18 interface, and this is not limited in this embodiment of the present invention.

In addition, concepts used in the embodiments of the present invention are described.

A terminal refers to a device that provides a user with voice and/or data connectivity, for example, may include a handheld device with a wireless connection function or a processing device that is connected to a wireless modem. The terminal may communicate with a core network by using an RAN, and exchange voice and/or data with the RAN. The terminal may be referred to as UE (user equipment), a wireless terminal, a mobile terminal, a subscriber unit, a subscriber station, a mobile station (Mobile), a remote station, an access point (AP), a remote terminal, an access terminal, a user terminal, a user agent, a user device, or the like. For example, the terminal may be a mobile phone (or referred to as a "cellular" phone), a computer with a mobile terminal, a portable, pocket-sized, handheld, computer built-in, or in-vehicle mobile apparatus, such as a personal communication service (PCS) phone, a cordless telephone set, a Session Initiation Protocol (SIP) phone, a wireless local loop (WLL) station, or a personal digital assistant (PDA).

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following further describes the embodiments of the present invention in detail with reference to the accompanying drawings in this specification.

Figure 2:
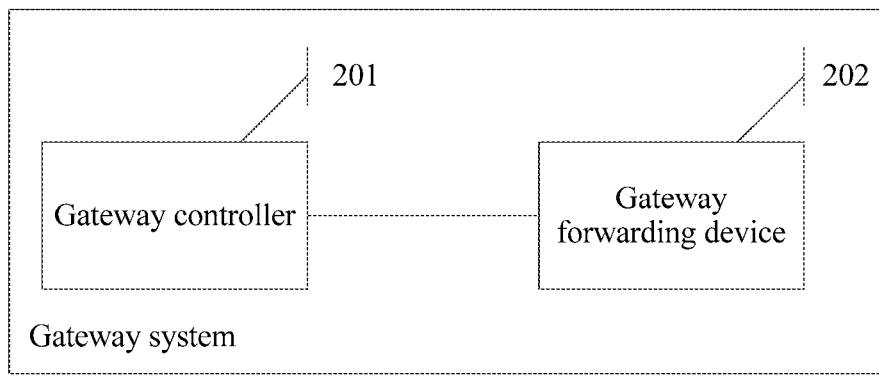
FIG. 2 is a schematic diagram of a gateway system according to an embodiment of the present invention.

Referring to FIG. 2, an embodiment of the present invention provides a gateway system. The gateway system may include a gateway controller 201 and a gateway forwarding device 202. The gateway controller 201 may be the foregoing GW-C in FIG. 1, and the gateway forwarding device 202 may be the foregoing GW-U in FIG. 1.

The gateway controller 201 may be configured to generate control information corresponding to different network standards. There may be only one type or more types of control information for one network standard.

The gateway forwarding device 202 may be configured to receive and send, according to each piece of control information generated by the gateway controller 201, a data packet generated in a network standard corresponding to each piece of control information.

It may be considered that the gateway controller 201 is configured to generate control information corresponding to different network standards, for example, may generate control information corresponding to a 3GPP network standard, control information corresponding to a trusted non-3GPP network standard, or control information corresponding to an untrusted 3GPP network standard. The gateway forwarding device 202 receives and sends a data packet in various network standards according to the control information generated by the gateway controller 201. Therefore, one gateway system may be applicable to multiple network standards without configuring a corresponding gateway for each network standard, thereby reducing consumption of hardware resources, and simplifying a system structure.

Optionally, in this embodiment of the present invention, the data packet received and sent by the gateway forwarding device 202 may include any one or more of a GTP data packet, a PMIP data packet, an L2TP data packet, an IPSec data packet, a GRE data packet, or a layer 2 VLAN data packet, or may include another possible data packet.

Figure 3:
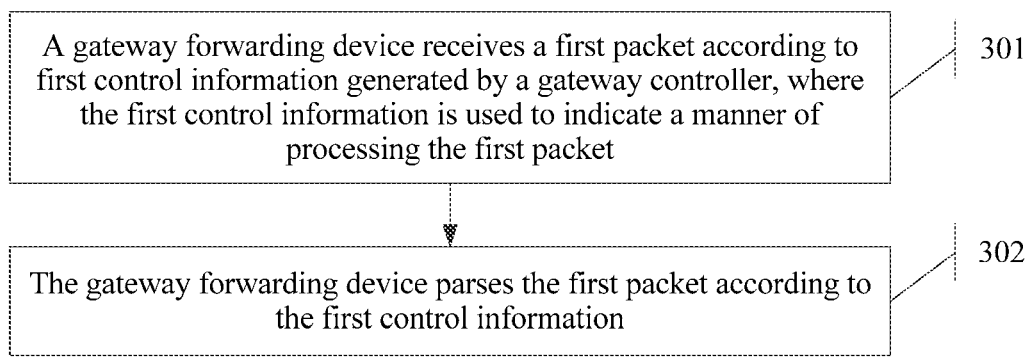
FIG. 3 is a flowchart of a first data packet processing method according to an embodiment of the present invention.

Referring to FIG. 3, based on a same invention concept, an embodiment of the present invention provides a data packet processing method. The method may be applied to the gateway system shown in FIG. 2. A procedure of the method is described as follows.

Step 301: A gateway forwarding device 202 receives a first data packet according to first control information generated by a gateway controller 201, where the first control information is used to indicate a manner of processing the first data packet.

Optionally, in this embodiment of the present invention, the gateway forwarding device 202 may first receive control information delivered by the gateway controller 201. In this embodiment of the present invention, control information that is used to indicate a manner of processing a received data packet is referred to as the first control information, and the received data packet is referred to as the first data packet.

That is, the gateway controller 201 determines specific forwarding behavior for the gateway forwarding device 202 (that is, generates control information corresponding to the gateway forwarding device 202). For example, the gateway controller 201 may comprehensively determine forwarding behavior of the gateway forwarding device 202 based on multiple different factors such as a local policy, a current access type, and capability information of the gateway forwarding device 202, and sends the control information to the gateway forwarding device 202 by using an S18 interface. The control information may carry behavior of receiving and/or sending a data packet on a forwarding plane (that is, the gateway forwarding device 202), information related to the receiving and sending behavior, and the like. Data packet forwarding behavior on the forwarding plane is defined in a relatively flexible manner in this embodiment of the present invention. Different forwarding scenarios may correspond to different pieces of control information, and different gateway forwarding devices 202 may also correspond to different pieces of control information.

Figure 4:
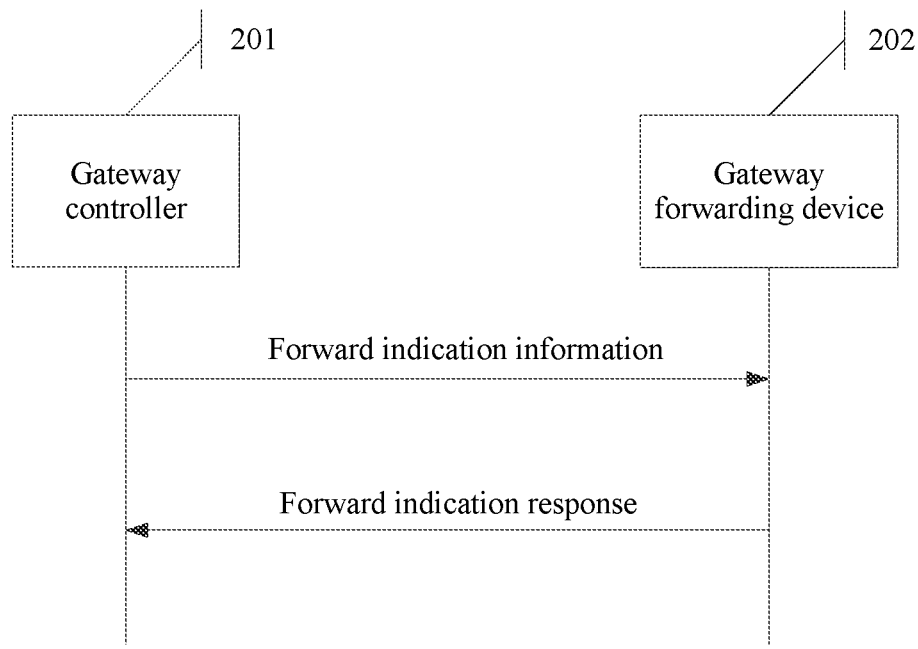
FIG. 4 is an interaction diagram in which a gateway controller controls a gateway forwarding device according to an embodiment of the present invention.

For example, referring to FIG. 4, FIG. 4 is a schematic diagram in which a gateway controller 201 delivers control information to a gateway forwarding device 202. Generally, after receiving the control information, the gateway forwarding device 202 may send a response message to the gateway controller 201, so as to notify the gateway controller 201 that the gateway forwarding device 202 receives and sends a data packet according to the received control information. In FIG. 4, an example in which the control information is a forward indication request and the response message is a forward indication response is used.

Optionally, in this embodiment of the present invention, the first data packet may be an uplink data packet or a downlink data packet.

Step 302: The gateway forwarding device 202 parses the first data packet according to the first control information.

The gateway forwarding device 202 processes the received first data packet according to the first control information. A parsing process herein may include decapsulation, decryption, and the like.

The solution described in the procedure in FIG. 3 is illustrated by using the following examples.

Example 1

In a 3GPP access scenario, the gateway system functions as an SGW.

Uplink: The gateway controller 201 sends the first control information to the gateway forwarding device 202 by using an S18 interface, and the first control information may include, for example, S1-U SGW user plane information (which may also be referred to as SGW user plane information), that is, control information that is used to define a manner of processing a corresponding data packet received from the S1-U interface in FIG. 1. For example, the S1-U SGW user plane information may be used to define a manner of processing different data packets received from the S1-U interface (a user plane interface, configured to establish a tunnel between a GW and an evolved Node B (eNodeB), and transport a user data service, that is, user plane data), such as a serving GW address for user plane (serving gateway address for user plane) or a serving GW TEID for S1-U user plane (serving gateway tunnel endpoint identifier for S1-U interface user plane). The gateway forwarding device 202 receives, from the S1-U interface based on the S1-U SGW user plane information, a data packet (that is, the first data packet) that matches the S1-U SGW user plane information, for example, receives a GTP data packet; and after the receiving, performs processing such as decapsulation on the first data packet according to the S1-U SGW user plane information.

Downlink: The gateway controller 201 sends the first control information to the gateway forwarding device 202 by using an S18 interface, and the first control information may include, for example, S5/S8 SGW user plane information, that is, control information that is used to define a manner of processing a corresponding data packet received from the S5/S8 interface in FIG. 1. For example, the S5/S8 SGW user plane information may be used to define a manner of processing different data packets received from the S5/S8 interface, such as a serving GW address for user plane, or a serving GW TEID for S5/S8 user plane (serving gateway tunnel endpoint identifier for S5/S8 interface user plane). The gateway forwarding device 202 receives, from the S5/S8 interface based on the S5/S8 SGW user plane information, a data packet (that is, the first data packet) that matches the S5/S8 SGW user plane information, for example, receives a GTP data packet; and after the receiving, performs processing such as decapsulation on the first data packet according to the S5/S8 SGW user plane information.

Example 2

In a 3GPP access scenario, the gateway system functions as a PGW.

Uplink: The gateway controller 201 sends the first control information to the gateway forwarding device 202 by using an S18 interface, and the first control information may include, for example, S5/S8 PGW user plane information (which may also be referred to as PGW user plane information), that is, control information that is used to define a manner of processing a corresponding data packet received from the S5/S8 interface in FIG. 1. For example, the S5/S8 SGW user plane information may be used to define a manner of processing different data packets received from the S5/S8 interface (an interface between a serving gateway and a packet data network gateway), such as a PDN GW address for user plane (packet data network gateway user plane address), or a PDN GW TEID for S5/S8 user plane (packet data network gateway tunnel endpoint identifier for S5/S8 interface user plane). The gateway forwarding device 202 receives, from the S5/S8 interface based on the S5/S8 PGW user plane information, a data packet (that is, the first data packet) that matches the S5/S8 PGW user plane information, for example, receives a GTP data packet; and after the receiving, performs processing such as decapsulation on the first data packet according to the S5/S8 PGW user plane information.

Downlink: The gateway controller 201 sends the first control information to the gateway forwarding device 202 by using an S18 interface, and the first control information may include, for example, terminal user information, and S5/S8 PGW user plane information, that is, control information that is used to define a manner of processing a corresponding data packet received from the SGi interface (an interface configured to connect a PGW and the Extranet) in FIG. 1. For example, the terminal user information may be used to define a manner of processing a data packet of a UE address received from the SGi interface. The gateway forwarding device 202 receives, from the SGi interface based on the terminal user information, a data packet (that is, the first data packet) that matches the UE address, for example, receives an IP data packet; and after the receiving, performs processing such as encapsulation on the first data packet according to the S5/S8 PGW user plane information.

Example 3

In a 3GPP access scenario, the gateway system functions as a PGW and an SGW. In this case, the PGW and the SGW are a same entity.

Uplink: The gateway controller 201 sends the first control information to the gateway forwarding device 202 by using an S18 interface, and the first control information may include, for example, S1-U SGW user plane information (which may also be referred to as SGW user plane information), that is, control information that is used to define a manner of processing a corresponding data packet received from the S1-U interface in FIG. 1. For example, the S1-U SGW user plane information may be used to define a manner of processing different data packets received from the S1-U interface, such as a serving GW address for user plane (serving gateway address for user plane), or a serving GW TEID for S1-U user plane (serving gateway tunnel endpoint identifier for S1-U interface user plane). The gateway forwarding device 202 receives, from the S1-U interface based on the S1-U SGW user plane information, a data packet (that is, the first data packet) that matches the S1-U SGW user plane information, for example, receives a GTP data packet; and after the receiving, performs processing such as decapsulation on the first data packet according to the S1-U SGW user plane information.

Downlink: The gateway controller 201 sends the first control information to the gateway forwarding device 202 by using an S18 interface, and the first control information may include, for example, terminal user information, and S1-U eNB user plane information (which may also be referred to as S5/S8 PGW user plane information or PGW user plane information), that is, control information that is used to define a manner of processing a corresponding data packet received from the SGi interface in FIG. 1. For example, the terminal user information may be used to define a manner of processing a data packet of a UE address received from the SGi interface. The gateway forwarding device 202 receives, from the SGi interface based on the terminal user information, a data packet (that is, the first data packet) that matches the UE address, for example, receives an IP data packet; and after the receiving, performs processing such as encapsulation on the first data packet according to the S1-U eNB user plane information.

Example 4

In an untrusted non-3GPP access scenario, the gateway system functions as an ePDG Uplink: The gateway controller 201 sends the first control information to the gateway forwarding device 202 by using an S18 interface, and the first control information may include, for example, an SPI (Security Parameter Index) and a corresponding key. The gateway forwarding device 202 receives a data packet (that is, the first data packet) from a terminal (that is, the UE1 in FIG. 1) based on the first control information, for example, receives an IPsec data packet. After the receiving, the gateway forwarding device 202 finds the key in the first control information based on the SPI of the first data packet, and performs processing such as decryption on the received IPSec data packet.

Downlink: The gateway controller 201 sends the first control information to the gateway forwarding device 202 by using an S18 interface, and the first control information may include, for example, S2b ePDG user plane information (which may also be referred to as ePDG user plane information). The gateway forwarding device 202 receives, from an S2b interface based on the first control information, a data packet (that is, the first data packet) that matches the first control information, for example, receives a GTP data packet; and after the receiving, performs processing such as decapsulation on the first data packet according to the first control information.

Example 5

In a trusted non-3GPP access scenario, the gateway system functions as a TGW.

Uplink: The gateway controller 201 sends the first control information to the gateway forwarding device 202 by using an S18 interface, and the first control information may include, for example, a TGW MAC address. The gateway forwarding device 202 receives, from a terminal (that is, the UE1 in FIG. 1) based on the first control information, a data packet (that is, the first data packet) that matches the first control information; and performs corresponding processing on the first data packet according to the first control information.

Downlink: The gateway controller 201 sends the first control information to the gateway forwarding device 202 by using an S18 interface, and the first control information may include, for example, S2a TGW user plane information (which may also be referred to as TGW user plane information). The gateway forwarding device 202 receives, from an S2a interface based on the first control information, a data packet (that is, the first data packet) that matches the first control information, for example, receives a GTP data packet; and after the receiving, performs processing such as decapsulation on the first data packet according to the first control information.

In conclusion, in this embodiment of the present invention, the first control information may be used to indicate a specific operation to be performed by the gateway forwarding device 202.

Further, in addition to the specific operation to be performed by the gateway forwarding device 202, the first control information may further indicate processing procedure information for the gateway forwarding device 202 in a processing process.

Optionally, in this embodiment of the present invention, the first control information may include processing procedure information of the first data packet in the gateway forwarding device 202.

For example, the gateway forwarding device 202 may abstract a forwarding plane into multiple objects by using an object-oriented implementation method, and provide, in an object manner, a service for receiving and sending a data packet. For example, a terminal accesses a network. The gateway controller 201 creates different objects for terminals based on a situation (for example, an access manner or subscription information) of each terminal, and instructs the gateway forwarding device 202 to instantiate the created objects, so as to provide services to the terminals. Such a flexible dynamic definition manner reflects programmability of the gateway forwarding device 202.

An object is abstract expression of an entity with a particular function and attribute. The object needs to be instantiated before use, and is provided with some actions and attributes by means of instantiation. The gateway controller 201 creates an object, that is, the gateway controller 201 needs to specify an attribute of the object and an action that needs to be completed by the object. The attribute is used to describe a feature of the object, and the action is used to describe a function of the object.

For example, a function for receiving and sending a data packet may be divided into several minimum enforcement functions, and each minimum enforcement function may be referred to as an atomic action. In the present invention, the gateway forwarding device 202 may include the following objects after abstraction: an interface object, a link object, a session object, a bearer object, an SDF (service data flow) object or a flow object, and the like; and may certainly include another object. No limitation is imposed in the present invention.

An IP (Internet Protocol)/MAC address of an interface may be used as an attribute of an interface object. For example, an IP/MAC address of an interface uniquely corresponds to one interface object. A link address/address set/index may be used as an attribute of a link object, such as one link address or a group of link addresses, or a link index. For example, one GTP link address, one PMIP link address, or one IPsec link address uniquely corresponds to one link object, or SPI information of an IPsec link also uniquely corresponds to one link object. An IP/MAC address of a terminal or a GRE key (key) of a terminal may be used as an attribute of a session object. For example, an IP or a GRE key of a terminal uniquely corresponds to one session object. TEID/TFT (Traffic Flow Template) information of a tunnel may be used as an attribute of a bearer object. For example, a group of TEIDs of tunnels or one TFT uniquely correspond/corresponds to one bearer object. 5-tuple information of a data packet may be used as an attribute of an SDF/flow object. For example, one piece of specific 5-tuple information uniquely corresponds to one specific SDF/flow object.

In this embodiment of the present invention, an inclusion relationship may be generated between instantiated objects due to different abstract granularities of the objects. For example, one session object instance may include multiple bearer object instances, and one bearer object instance may include multiple SDF/flow object instances. The gateway forwarding device 202 may store a table of a relationship mapping between objects. For example, the relationship mapping table includes: a mapping relationship between an IP address of a terminal and a session object, a mapping relationship between TEID/TFT information of a tunnel and a bearer object, a mapping relationship between 5-tuple (or referred to as IP quintuplets) of a data packet and a flow object, and the like. When a data packet is being transmitted between objects, a destination object instance may be found according to information that matches the data packet (for example, according to an IP of a terminal, a TEID, or IP quintuplets corresponding to the data packet).

The objects are described in the following.

Interface object: The interface object receives, from a device, a data packet that matches an attribute of the interface object, and sends the data packet to another device. In addition, according to a definition of the gateway controller 201, the interface object may further forward the data packet to a link object, a session object, or the like. For example, according to the definition of the gateway controller 201, the interface object sends, based on a destination IP/source MAC address of the data packet, the data packet to an object corresponding to the destination IP/source MAC address (that is, performs matching between the destination IP/source MAC address of the data packet and an attribute of another object, and sends the data packet to a corresponding object). If the destination IP of the data packet is matched, and the destination IP of the data packet is a link IP, the interface object sends the data packet to a corresponding link object; if the destination IP of the data packet is matched, and the destination IP of the data packet is an IP of a terminal, the interface object sends the data packet to a session object; if the source MAC address of the data packet is matched, and the source MAC address of the data packet is a MAC address of a terminal, the interface object sends the data packet to a session object; or the like. For example, a match action executed by the interface object may be ObjectMatch. In this case, the gateway controller 201 may define that a match type of ObjectMatch=a destination IP address/MAC address. For example, an action that the interface object sends a data packet may be SendTo (sending data to a specified destination).

Link object: The link object receives a data packet that matches an attribute of the link object, and completes related operations such as encapsulation and decapsulation on a data packet such as an IPsec tunnel data packet. When the link object decapsulates a data packet, the gateway controller 201 may provide information (for example, an SPI and key information corresponding to the SPI) related to decapsulation. In addition, according to a definition of the gateway controller 201, the link object may further forward the data packet to a bearer object, a session object, or the like. For example, according to the definition of the gateway controller 201, the link object may send the data packet to a corresponding object based on a GRE key/TEID of the data packet. If the GRE key of the data packet is matched, the link object sends the data packet to a corresponding session object; if the TEID of the data packet is matched, the link object sends the data packet to a bearer object; or the like. For example, a match action executed by the link object may be ObjectMatch. In this case, the gateway controller 201 may define that a match type of ObjectMatch=a GRE key/TEID. For example, an action that the link object sends a data packet may be SendTo.

Session object: The session object receives a data packet that matches an attribute of the session object; and completes a related decapsulation/encapsulation action of a data packet such as a tunnel data packet; and may further perform operations such as encryption and decryption on the data packet. When the session object encapsulates a data packet, the gateway controller 201 may provide tunnel data packet information (for example, a GRE key) required for the encapsulation action. In addition, according to a definition of the gateway controller 201, the session object may further forward the data packet to a bearer object or the like. For example, according to the definition of the gateway controller 201, the session object sends the data packet to a corresponding bearer object based on TFT information. For example, a match action executed by the session object may be ObjectMatch. In this case, the gateway controller 201 defines that a match type of ObjectMatch=a TFT. For example, an action that the session object sends a data packet may be SendTo.

Bearer object: The bearer object receives a data packet that matches an attribute of the bearer object, and completes a related decapsulation/encapsulation action of a data packet such as a tunnel data packet. The gateway controller 201 may provide tunnel data packet information (for example, a TEID) required for the encapsulation action. In this embodiment of the present invention, according to a definition of the gateway controller 201, the bearer object may further forward the data packet to an SDF object, a flow object, an interface object, or the like. For example, according to the definition of the gateway controller 201, the bearer object sends the data packet to a corresponding SDF/flow object based on 5-tuple information. For example, a match action executed by the bearer object may be ObjectMatch. In this case, the gateway controller 201 defines that a match type of ObjectMatch=5-tuple. For example, an action that the bearer object sends a data packet may be SendTo.

In this embodiment of the present invention, a data packet forwarding operation performed by the gateway forwarding device 202 may be divided into multiple minimum actions, and each minimum action is referred to as an atomic action. Information required in a process of executing an atomic action may be obtained from a corresponding object attribute, or may be used as atomic action information and delivered by the gateway controller 201 to the gateway forwarding device 202. For example, the gateway controller 201 delivers a control message to the gateway forwarding device 202 by using an S18 interface, so as to define behavior that the gateway forwarding device 202 receives and sends a data packet. For example, the control message delivered by the gateway controller 201 may be a forward indication request. The control message may include information such as an atomic action, atomic action information, an object, and an object attribute. An atomic action executed by the gateway forwarding device 202 to forward a data packet may include, for example, at least one of ReceivePacket, ObjectMatch, Decapsulate, Encapsulate, Encrypt, Decrypt, SendTo, or SendPacket. The following describes the atomic actions.

ReceivePacket: That is, an interface object receives, based on control information (for example, a PDN GW address for user plane) delivered by the gateway controller 201, an uplink data packet or a downlink data packet that meets the control information.

ObjectMatch: used to query a destination object instance when a data packet is being sent between objects, that is, search for a relationship between object instances in the gateway forwarding device 202 according to an object match type delivered by the gateway controller 201, and output an ID of the destination object instance (for example, query an ID of a bearer object instance according to a TEID). ObjectMatch exists in an implementation in which the gateway forwarding device 202 manages the relationship between the object instances. If the gateway controller 201 manages the relationship between the object instances in the gateway forwarding device 202, ObjectMatch may not need to be performed, and instead, the gateway controller 201 directly notifies the gateway forwarding device 202 of how to forward a data packet between all objects, that is, the gateway forwarding device 202 can learn of the ID of the destination object instance without querying.

Decapsulate: used to decapsulate a data packet. For example, a decapsulation operation may be performed on the data packet based on an object attribute (for example, a decapsulation type) that is delivered by the gateway controller 201 and used to execute the atomic action.

Encapsulate: used to encapsulate a data packet. For example, the data packet may be encapsulated based on an object attribute (for example, a data packet encapsulation type and an endpoint value) that is delivered by the gateway controller 201 and used to execute the atomic action.

Encrypt: used to encrypt a data packet. For example, encryption processing may be performed on the data packet based on information (for example, information such as an SPI and a key corresponding to the SPI) that is delivered by the gateway controller 201 and used to execute the atomic action.

Decrypt: used to decrypt a data packet. For example, decryption processing may be performed on the data packet based on information (for example, information such as an SPI and a key corresponding to the SPI) that is delivered by the gateway controller 201 and used to execute the atomic action.

SendTo: used to send a data packet between objects. For example, the data packet may be sent to a specified object instance (that is, a destination object instance) according to an ID of the object instance that is output during ObjectMatch or an ID of the destination object instance that is delivered by the gateway controller 201 (for example, an ID of a bearer object instance to which a data packet is to be sent).

SendPacket: used to send a data packet between network elements (for example, an SGW sends a data packet to a PGW). For example, an interface object may send the data packet to another network element according to SendPacket information (for example, a destination IP) delivered by the gateway controller 201.

The foregoing enumerated objects and atomic actions are merely used for examples, and are not intended to limit the present invention. It is not excluded in this embodiment of the present invention that another possible object, attribute, atomic action, and the like may be defined by using the gateway controller 201, provided that a service can be provided for forwarding a data packet.

The gateway controller 201 sends the first control information to the gateway forwarding device 202 by using an S18 interface. For example, the first control information is a forward indication request. The first control information carries information, such as an object, an action, and an attribute, that is required by the gateway forwarding device 202 for receiving and sending a data packet. In addition, the first control information may further include orchestration information of all actions, for example, orchestration of actions executed by an object (that is, an execution sequence of corresponding actions of each object), and orchestration of communication between objects (a data packet traversing sequence among objects). Actions of an object may be successively executed (successively executed in orchestration order of the actions included in the object). The orchestration of communication between objects may be implemented by the gateway controller 201 by performing ObjectMatch of each object. For example, an instance A of a session object performs ObjectMatch, and if a TFT matches, a next destination object corresponding to the data packet may be founded, for example, an instance B of a bearer object. Alternatively, in another implementation, the control information delivered by the gateway controller 201 carries a data packet transmission relationship between object instances. For example, a data packet should be processed by the instance B of the bearer object after the instance A of the session object completes execution, that is, the gateway controller 201 provides specific data packet execution information.

The following examples are separately used to describe an implementation of the procedure in FIG. 3 after the gateway forwarding device 202 uses an object-oriented implementation method.

Example 6

In a 3GPP access scenario, the gateway system functions as an SGW.

Uplink: The gateway controller 201 sends the first control information to the gateway forwarding device 202 by using an S18 interface, and the first control information may include, for example, S1-U SGW user plane information (which may also be referred to as SGW user plane information), that is, control information that is used to define a manner of processing a corresponding data packet received from the S1-U interface in FIG. 1. For example, the S1-U SGW user plane information may be used to define a manner of processing different data packets received from the S1-U interface, such as a serving GW address for user plane. An interface object of the gateway forwarding device 202 may receive, from the S1-U interface based on the S1-U SGW user plane information, a data packet (that is, the first data packet) that matches the S1-U SGW user plane information, for example, receive a GTP data packet; and after the receiving, may continue to perform corresponding processing on the first data packet according to the first control information. For example, after the receiving, the interface object sends the first data packet to a link object. The link object decapsulates the first data packet based on a data packet decapsulation type, and sends the decapsulated first data packet to a bearer object. The bearer object encapsulates the decapsulated first data packet, for example, performs GTP encapsulation, and then sends the encapsulated first data packet to the interface object. The interface object sends the encapsulated first data packet to a PGW to which the data packet points.

Orchestration information (that is, a data packet traversing sequence) included in the first control information may be:

Interface_ReceivePacket>>Link_Decapsulate>>Bearer_Encapsulate>>Interface_SendPacket Downlink: The gateway controller 201 sends the first control information to the gateway forwarding device 202 by using an S18 interface, and the first control information may include, for example, S5/S8 SGW user plane information (which may also be referred to as SGW user plane information), that is, control information that is used to define a manner of processing a corresponding data packet received from the S5/S8 interface in FIG. 1. For example, the S5/S8 SGW user plane information may be used to define a manner of processing different data packets received from the S5/S8 interface, such as a serving GW address for user plane. An interface object of the gateway forwarding device 202 receives, from the S5/S8 interface based on the S5/S8 SGW user plane information, a data packet (that is, the first data packet) that matches the S5/S8 SGW user plane information, for example, receives a GTP data packet; and after the receiving, continues to perform corresponding processing on the first data packet according to the first control information. For example, after the receiving, the interface object sends the first data packet to a link object. The link object decapsulates the first data packet based on a data packet decapsulation type, and sends the decapsulated first data packet to a bearer object. The bearer object encapsulates the decapsulated first data packet, for example, encapsulates the decapsulated first data packet into a GTP data packet, and then sends the encapsulated first data packet to the interface object. The interface object sends the encapsulated first data packet to an eNB (evolved NodeB) to which the data packet points.

Orchestration information (that is, a data packet traversing sequence) included in the first control information may be:

Interface_ReceivePacket>>Link_Decapsulate>>Bearer_Encapsulate>>Interface_SendPacket Example 7-1

In a 3GPP access scenario, the gateway system functions as a PGW.

Uplink: The gateway controller 201 sends the first control information to the gateway forwarding device 202 by using an S18 interface, and the first control information may include, for example, S5/S8 PGW user plane information (which may also be referred to as PGW user plane information), that is, control information that is used to define a manner of processing a corresponding data packet received from the S5/S8 interface in FIG. 1. For example, the S5/S8 SGW user plane information may be used to define a manner of processing different data packets received from the S5/S8 interface, such as a PDN GW address for user plane. An interface object of the gateway forwarding device 202 receives, from the S5/S8 interface based on the S5/S8 PGW user plane information, a data packet (that is, the first data packet) that matches the S5/S8 PGW user plane information, for example, receives a GTP data packet; and after the receiving, continues to perform corresponding processing on the first data packet according to the first control information. For example, the interface object sends the first data packet to a link object. The link object decapsulates the first data packet according to a data packet decapsulation type, and then sends the decapsulated data packet to the interface object. The interface object sends the decapsulated first data packet to an external network.

Orchestration information included in the first control information may be:

Interface_ReceivePacket>>Link_Decapsulate>>Interface_SendPacket

Downlink: The gateway controller 201 sends the first control information to the gateway forwarding device 202 by using an S18 interface, and the first control information may include, for example, terminal user information, and S5/S8 SGW user plane information (which may also be referred to as SGW user plane information), that is, control information that is used to define a manner of processing a corresponding data packet received from the SGi interface in FIG. 1. For example, the terminal user information may be used to define a manner of processing a data packet of a UE address received from the SGi interface. An interface object of the gateway forwarding device 202 receives, from the SGi interface based on the terminal user information, a data packet (that is, the first data packet) that matches the UE address, for example, receives an IP data packet; and after the receiving, performs processing such as encapsulation on the first data packet according to the S5/S8 SGW user plane information. For example, the interface object sends the first data packet to a bearer object. The bearer object encapsulates the first data packet according to an SGW address for user plane and an SGW TEID of the user plane of the S5/S8 interface, and then sends the encapsulated first data packet to the interface object. The interface object sends the encapsulated first data packet to an SGW.

Orchestration information included in the first control information may be:

Interface_ReceivePacket>>Bearer_Encapsulate>>Interface_SendPacket

Example 7-2

In a 3GPP access scenario, the gateway system functions as a PGW, and the PGW transmits a point-to-point protocol (PPP) data packet through an L2TP tunnel.

Uplink: The gateway controller 201 sends the first control information to the gateway forwarding device 202 by using an S18 interface, and the first control information may include, for example, S5/S8 PGW user plane information (which may also be referred to as PGW user plane information) and L2TP tunnel information, that is, control information that is used to define a manner of processing a corresponding data packet received from the S5/S8 interface in FIG. 1. For example, the S5/S8 SGW user plane information may be used to define a manner of processing different data packets received from the S5/S8 interface, such as a PDN GW address for user plane. An interface object of the gateway forwarding device 202 receives, from the S5/S8 interface based on the S5/S8 PGW user plane information, a data packet (that is, the first data packet) that matches the S5/S8 PGW user plane information, for example, receives a GTP data packet; and after the receiving, continues to perform corresponding processing on the first data packet according to the first control information. For example, the interface object sends the first data packet to a link object. The link object decapsulates the first data packet according to a data packet decapsulation type, then encapsulates the decapsulated data packet into an L2TP data packet according to a session ID and a tunnel ID that are of the L2TP tunnel information, and sends the encapsulated L2TP tunnel data packet to the interface object. The interface object sends the decapsulated L2TP tunnel data packet to an external network.

Orchestration information included in the first control information may be:

Interface_ReceivePacket>>Link_Decapsulate>>Link_Encapsulate>>Interface_SendPacket Downlink: The gateway controller 201 sends the first control information to the gateway forwarding device 202 by using an S18 interface, and the first control information may include, for example, L2TP tunnel information and S5/S8 SGW user plane information (which may also be referred to as SGW user plane information), that is, control information that is used to define a manner of processing a corresponding data packet received from the SGi interface in FIG. 1. For example, terminal user information may be used to define a manner of processing a data packet of an L2TP tunnel address received from the SGi interface. An interface object of the gateway forwarding device 202 receives, from the SGi interface based on the terminal user information, a data packet (that is, the first data packet) that matches the tunnel address, for example, receives an L2TP data packet; and after the receiving, performs processing such as decapsulation on the first data packet according to the S5/S8 SGW user plane information. For example, the interface object sends the first data packet to a link object. The link object decapsulates the encapsulated L2TP data packet into a PPP data packet; then identifies whether the data packet is an L2TP data packet and whether the decapsulated PPP packet is a data packet; and sends the data packet to a bearer object. The bearer object encapsulates the first data packet according to an SGW address for user plane and an SGW TEID of the user plane of the S5/S8 interface, and then sends the encapsulated first data packet to the interface object. The interface object sends the encapsulated first data packet to an SGW.

Orchestration information included in the first control information may be:

Interface_ReceivePacket>>Link_Decapsulate>>Link_PacketMatch>>Bearer_Encapsulate>>Interface_SendPacket Example 8

In a 3GPP access scenario, the gateway system functions as a PGW and an SGW. In this case, the PGW and the SGW are a same entity.

Uplink: The gateway controller 201 sends the first control information to the gateway forwarding device 202 by using an S18 interface, and the first control information may include, for example, S1-U SGW user plane information (which may also be referred to as SGW user plane information), that is, control information that is used to define a manner of processing a corresponding data packet received from the S1-U interface in FIG. 1. For example, the S1-U SGW user plane information may be used to define a manner of processing different data packets received from the S1-U interface, such as a serving GW address for user plane. An interface object of the gateway forwarding device 202 receives, from the S1-U interface based on the S1-U SGW user plane information, a data packet (that is, the first data packet) that matches the S1-U SGW user plane information, for example, receives a GTP data packet. After the receiving, the interface object sends the first data packet to a link object. The link object decapsulates the first data packet according to a data packet decapsulation type.

Orchestration information included in the first control information may be:

Interface_ReceivePacket>>Link_Decapsulate

Downlink: The gateway controller 201 sends the first control information to the gateway forwarding device 202 by using an S18 interface, and the first control information may include, for example, terminal user information, and S1-U eNB user plane information (which may also be referred to as eNB user plane information), that is, control information that is used to define a manner of processing a corresponding data packet received from the SGi interface in FIG. 1. For example, the terminal user information may be used to define a manner of processing a data packet of a UE address received from the SGi interface. An interface object of the gateway forwarding device 202 receives, from the SGi interface based on the terminal user information, a data packet (that is, the first data packet) that matches the UE address, for example, receives an IP data packet; and after the receiving, performs processing such as encapsulation on the first data packet according to the S1-U eNB user plane information. For example, the interface object sends the first data packet to a bearer object. The bearer object encapsulates the first data packet according to an eNB address for user plane and an eNB TEID of the user plane of the S1-U interface, and then sends the encapsulated first data packet to the interface object. The interface object sends the encapsulated first data packet to an eNB.

Orchestration information included in the first control information may be:

Interface_ReceivePacket>>Bearer_Encapsulate>>Interface_SendPacket

Example 9

In a 3GPP access scenario, the gateway system functions as an SGW. A data packet between the SGW and a PGW is encapsulated in a PMIP format.

Uplink: The gateway controller 201 sends the first control information to the gateway forwarding device 202 by using an S18 interface, and the first control information may include, for example, S1-U SGW user plane information (which may also be referred to as SGW user plane information), that is, control information that is used to define a manner of processing a corresponding data packet received from the S1-U interface in FIG. 1. For example, the S1-U SGW user plane information may be used to define a manner of processing different data packets received from the S1-U interface, such as a serving GW address for user plane. An interface object of the gateway forwarding device 202 may receive, from the S1-U interface based on the S1-U SGW user plane information, a data packet (that is, the first data packet) that matches the S1-U SGW user plane information, for example, receive a GTP data packet; and after the receiving, may continue to perform corresponding processing on the first data packet according to the first control information. For example, after the receiving, the interface object sends the first data packet to a link object. The link object decapsulates the first data packet based on a data packet decapsulation type, and sends the decapsulated first data packet to a session object. An attribute of the session object is, for example, a GRE key. The session object performs PMIP encapsulation on the decapsulated first data packet based on the GRE key, and then sends the encapsulated first data packet to the interface object. The interface object sends the encapsulated first data packet to the PGW to which the data packet points.

Orchestration information (that is, a data packet traversing sequence) included in the first control information may be:

Interface_ReceivePacket>>Link_Decapsulate>>Session_Encapsulate>>Interface_SendPacket Downlink: The gateway controller 201 sends the first control information to the gateway forwarding device 202 by using an S18 interface, and the first control information may include, for example, S5/S8 SGW user plane information (which may also be referred to as SGW user plane information), that is, control information that is used to define a manner of processing a corresponding data packet received from the S5/S8 interface in FIG. 1. For example, the S5/S8 SGW user plane information may be used to define a manner of processing different data packets received from the S5/S8 interface, such as a serving GW address for user plane. An interface object of the gateway forwarding device 202 receives, from the S5/S8 interface based on the S5/S8 SGW user plane information, a data packet (that is, the first data packet) that matches the S5/S8 SGW user plane information, for example, receives a GTP data packet; and after the receiving, continues to perform corresponding processing on the first data packet according to the first control information. For example, after the receiving, the interface object sends the first data packet to a session object. An attribute of the session object is a data packet decapsulation type (for example, PMIP) and a GRE key. The session object decapsulates the first data packet based on the attribute of the session object, and sends the decapsulated first data packet to a bearer object. The bearer object performs GTP encapsulation on the decapsulated first data packet, and then sends the encapsulated first data packet to the interface object. The interface object sends the encapsulated first data packet to an eNB to which the data packet points.

Orchestration information (that is, a data packet traversing sequence) included in the first control information may be:

Interface_ReceivePacket>>Session_Decapsulate>>Bearer_Encapsulate>>Interface_SendPacket Example 10

In an untrusted non-3GPP access scenario, the gateway system functions as an ePDG Uplink: The gateway controller 201 sends the first control information to the gateway forwarding device 202 by using an S18 interface, and the first control information may include, for example, an SPI (Serial Peripheral Interface) and a corresponding key. An interface object of the gateway forwarding device 202 receives a data packet (that is, the first data packet) from a terminal (that is, the UE1 in FIG. 1) based on the first control information, for example, receives an IPsec data packet; and after the receiving, continues to perform corresponding processing on the first data packet according to the first control information. For example, after the receiving, the interface object sends the data packet to a session object. An attribute of the session object is an SPI and a corresponding key. The session object finds a key according to an SPI of the data packet, decrypts the IPSec data packet, and sends the decrypted IPSec data packet to a bearer object. The bearer object performs GTP encapsulation on the decrypted IPSec data packet, and sends the encapsulated IPSec data packet to the interface object. The interface object sends the encapsulated IPSec data packet to a PGW to which the data packet points.

Orchestration information included in the first control information may be:

Interface_ReceivePacket>>Session Decrypt>>Bearer_Encapsulate>>Interface_SendPacket Downlink: The gateway controller 201 sends the first control information to the gateway forwarding device 202 by using an S18 interface, and the first control information may include, for example, S2b ePDG user plane information (which may also be referred to as ePDG user plane information). An interface object of the gateway forwarding device 202 receives, from an S2b interface based on the first control information, a data packet (that is, the first data packet) that matches the first control information, for example, receives a GTP data packet; and after the receiving, continues to perform corresponding processing on the first data packet according to the first control information. For example, after the receiving, the interface object sends the data packet to a link object. The link object decapsulates the first data packet according to a data packet decapsulation type, and sends the decapsulated first data packet to a session object. An attribute of the session object is an SPI and a corresponding key. The session object encrypts the decapsulated first data packet according to the attribute of the session object, and then sends the encrypted first data packet to the interface object. The interface object sends the encrypted first data packet to a terminal corresponding to the data packet.

Orchestration information included in the first control information may be:

Interface_ReceivePacket>>Link_Decapsulate>>Session_Encrypt>>Interface_SendPacket Example 11

In a trusted non-3GPP access scenario, the gateway system functions as a TGW.

Uplink: The gateway controller 201 sends the first control information to the gateway forwarding device 202 by using an S18 interface, and the first control information may include, for example, a TGW MAC address. An interface object of the gateway forwarding device 202 receives, from a terminal (that is, the UE1 in FIG. 1) based on the first control information, a data packet (that is, the first data packet) that matches the first control information; and after the receiving, performs corresponding processing on the first data packet according to the first control information. For example, after the receiving, the interface object continues to perform corresponding processing on the first data packet according to the first control information. For example, after the receiving, the interface object sends the first data packet to a bearer object. The bearer object encapsulates the first data packet according to the first control information, and sends the encapsulated first data packet to the interface object. Then the interface object sends the encapsulated first data packet to a PGW to which the data packet points.

Orchestration information included in the first control information may be:

Interface_ReceivePacket>>Bearer_Encapsulate>>Interface_SendPacket

Downlink: The gateway controller 201 sends the first control information to the gateway forwarding device 202 by using an S18 interface, and the first control information may include, for example, S2a TGW user plane information (which may also be referred to as TGW user plane information). An interface object of the gateway forwarding device 202 receives, from an S2a interface based on the first control information, a data packet (that is, the first data packet) that matches the first control information, for example, receives a GTP data packet; and after the receiving, continues to perform corresponding processing on the first data packet according to the first control information. For example, after the receiving, the interface object sends the data packet to a link object. The link object decapsulates the first data packet according to a data packet decapsulation type, and then sends the decapsulated first data packet to the interface object. The interface object sends the decapsulated first data packet to a corresponding terminal according to a destination IP (for example, an IP of a terminal) of the decapsulated first data packet.

Orchestration information included in the first control information may be:

Interface_ReceivePacket>>Link_Decapsulate>>Interface_SendPacket

Figure 5:
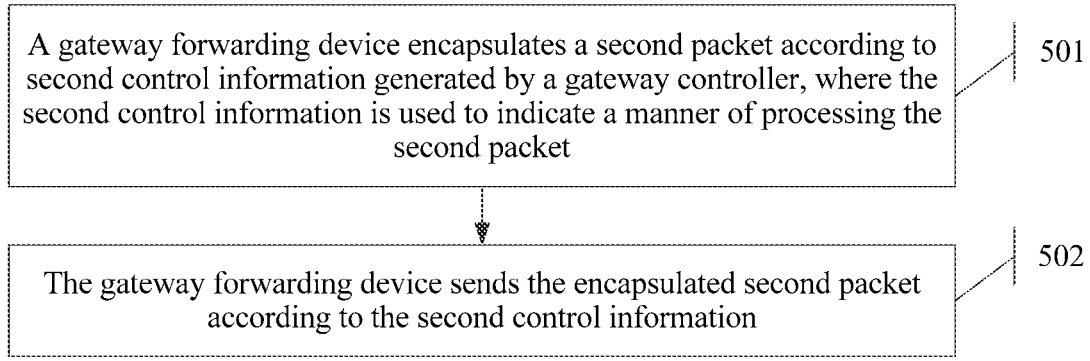
FIG. 5 is a flowchart of a second data packet processing method according to an embodiment of the present invention.

Referring to FIG. 5, based on a same invention concept, an embodiment of the present invention provides another data packet processing method. The method may be applied to the gateway system shown in FIG. 2. A procedure of the method is described as follows.

Step 501: A gateway forwarding device 202 encapsulates a second data packet according to second control information generated by a gateway controller 201, where the second control information is used to indicate a manner of processing the second data packet.

Optionally, in this embodiment of the present invention, the gateway forwarding device 202 may first receive control information delivered by the gateway controller 201. In this embodiment of the present invention, control information that is used to indicate a manner of processing a sent data packet is referred to as the second control information, and the sent data packet is referred to as the second data packet.

Similarly, the gateway controller 201 determines specific forwarding behavior for the gateway forwarding device 202 (that is, generates control information corresponding to the gateway forwarding device 202). For example, the gateway controller 201 may comprehensively determine forwarding behavior of the gateway forwarding device 202 based on multiple different factors such as a local policy, a current access type, and capability information of the gateway forwarding device 202, and sends the control information to the gateway forwarding device 202 by using an S18 interface. The control information may carry behavior of receiving and/or sending a data packet on a forwarding plane (that is, the gateway forwarding device 202), information related to the receiving and sending behavior, and the like. Data packet forwarding behavior on the forwarding plane is defined in a relatively flexible manner in this embodiment of the present invention. Different forwarding scenarios may correspond to different pieces of control information, and different gateway forwarding devices 202 may also correspond to different pieces of control information.

Reference may be still made to FIG. 4, and FIG. 4 is a schematic diagram in which a gateway controller 201 delivers control information to a gateway forwarding device 202.

Optionally, in this embodiment of the present invention, the second data packet may be an uplink data packet or a downlink data packet.

In this embodiment of the present invention, the gateway forwarding device 202 may further perform processing such as encryption on the second data packet in addition to encapsulation. The gateway forwarding device 202 can execute all operation steps indicated in the second control information.

Step 502: The gateway forwarding device 202 sends the encapsulated second data packet according to the second control information.

The solution described in the procedure in FIG. 5 is illustrated by using the following examples.

Example 12

In a 3GPP access scenario, the gateway system functions as an SGW.

Uplink: The gateway controller 201 sends the second control information to the gateway forwarding device 202 by using an S18 interface, and the second control information may include, for example, S5/S8 PGW user plane information (which may also be referred to as PGW user plane information), that is, control information that is used to define a manner of processing a corresponding data packet to be sent from the S5/S8 interface in FIG. 1. For example, the S5/S8 PGW user plane information may be used to define a manner of processing different data packets to be sent from the S5/S8 interface, such as a PDN GW address for the user plane, or a PDN GW TEID of the user plane. The gateway forwarding device 202 performs, based on the S5/S8 PGW user plane information, processing such as encapsulation on a data packet (that is, the second data packet) to be sent from the S5/S8 interface, and sends the encapsulated second data packet to a PGW to which the data packet points.

Downlink: The gateway controller 201 sends the second control information to the gateway forwarding device 202 by using an S18 interface, and the second control information may include, for example, S1-U eNB user plane information (which may also be referred to as eNB user plane information), that is, control information that is used to define a manner of processing a corresponding data packet to be sent from the S1-U interface in FIG. 1. For example, the S1-U eNB user plane information may be used to define a manner of processing different data packets to be sent from the S1-U interface, such as an eNB address for the user plane (evolved NodeB address for the user plane) or an eNB TEID of the user plane (evolved NodeB tunnel endpoint identifier of the user plane). The gateway forwarding device 202 performs, based on the S1-U eNB user plane information, processing such as encapsulation on a data packet (that is, the second data packet) to be sent from the S1-U interface, and sends the encapsulated second data packet to an eNB to which the data packet points.

Example 13-1

In a 3GPP access scenario, the gateway system functions as a PGW.

Uplink: The gateway controller 201 sends the second control information to the gateway forwarding device 202 by using an S18 interface, that is, control information that is used to define a manner of processing a corresponding IP data packet to be sent from the SGi interface in FIG. 1. It may be considered that the second control information includes a manner of processing a data packet to be sent to a destination address. The gateway forwarding device 202 sends, from the SGi interface based on a destination address of the IP data packet, the data packet to a device corresponding to the destination address of the data packet.

Downlink: The gateway controller 201 sends the second control information to the gateway forwarding device 202 by using an S18 interface, and the second control information may include, for example, S5/S8 SGW user plane information (which may also be referred to as SGW user plane information), that is, control information that is used to define a manner of processing a corresponding data packet to be sent from the S5/S8 interface in FIG. 1. For example, the S5/S8 SGW user plane information may be used to define a manner of processing different data packets to be sent from the S5/S8 interface, such as an SGW address for the user plane (SGW address for the user plane) or an SGW TEID of the user plane (SGW tunnel endpoint identifier of the user plane). The gateway forwarding device 202 performs, based on the S5/S8 SGW user plane information, processing such as encapsulation on a data packet (that is, the second data packet) to be sent from the S5/S8 interface, and sends the encapsulated second data packet to an SGW to which the data packet points.

Example 13-2

In a 3GPP access scenario, the gateway system functions as a PGW. The PGW sends and receives an L2TP data packet by using an SGi interface.

Uplink: The gateway controller 201 sends the second control information to the gateway forwarding device 202 by using an S18 interface, and the second control information may include, for example, L2TP tunnel information, that is, control information that is used to define a manner of processing a corresponding IP data packet to be sent from the SGi interface in FIG. 1. It may be considered that the second control information includes a manner of processing a data packet to be sent to a destination address. The gateway forwarding device 202 performs, based on a tunnel ID and a session ID that are of an L2TP tunnel, processing such as encapsulation on a data packet (that is, the second data packet) to be sent from the SGi interface, and sends, from the SGi interface, the encapsulated second data packet to a device corresponding to a destination address to which the data packet points.

Downlink: The gateway controller 201 sends the second control information to the gateway forwarding device 202 by using an S18 interface, and the second control information may include, for example, S5/S8 SGW user plane information (which may also be referred to as SGW user plane information), that is, control information that is used to define a manner of processing a corresponding data packet to be sent from the S5/S8 interface in FIG. 1. For example, the S5/S8 SGW user plane information may be used to define a manner of processing different data packets to be sent from the S5/S8 interface, such as an SGW address for the user plane (SGW address for the user plane) or an SGW TEID of the user plane (SGW tunnel endpoint identifier of the user plane). The gateway forwarding device 202 performs, based on the S5/S8 SGW user plane information, processing such as encapsulation on a data packet (that is, the second data packet) to be sent from the S5/S8 interface, and sends the encapsulated second data packet to an SGW to which the data packet points.

Example 14

In a 3GPP access scenario, the gateway system functions as a PGW and an SGW. In this case, the PGW and the SGW are a same entity.

Uplink: The gateway controller 201 sends the second control information to the gateway forwarding device 202 by using an S18 interface, that is, control information that is used to define a manner of processing a corresponding IP data packet to be sent from the SGi interface in FIG. 1. It may be considered that the second control information includes a manner of processing a data packet to be sent to a destination address. The gateway forwarding device 202 sends, from the SGi interface based on a destination address of the IP data packet, the data packet to a device corresponding to the destination address of the data packet.

Downlink: The gateway controller 201 sends the second control information to the gateway forwarding device 202 by using an S18 interface, and the second control information may include, for example, S1-U eNB user plane information (which may also be referred to as eNB user plane information), that is, control information that is used to define a manner of processing a corresponding data packet to be sent from the S1-U interface in FIG. 1. For example, the S1-U eNB user plane information may be used to define a manner of processing different data packets to be sent from the S1-U interface, such as an eNB address for the user plane, or an eNB TEID of the user plane. The gateway forwarding device 202 performs, based on the S1-U eNB user plane information, processing such as encapsulation on a data packet (that is, the second data packet) to be sent from the S1-U interface, and sends the encapsulated second data packet to an eNB to which the data packet points.

Example 15

In an untrusted non-3GPP access scenario, the gateway system functions as an ePDG Uplink: The gateway controller 201 sends the second control information to the gateway forwarding device 202 by using an S18 interface, and the second control information may include, for example, S2b PGW user plane information (which may also be referred to as PGW user plane information), that is, control information that is used to define a manner of processing a corresponding data packet to be sent from the S2b interface in FIG. 1. For example, the S2b PGW user plane information may be used to define a manner of processing different data packets to be sent from the S2b interface, such as a PDN GW address for the user plane, or a PDN GW TEID of the user plane. The gateway forwarding device 202 performs, based on the S2b PGW user plane information, processing such as encapsulation on a data packet (that is, the second data packet) to be sent from the S2b interface, and sends the encapsulated second data packet to a PGW to which the data packet points.

Downlink: The gateway controller 201 sends the second control information to the gateway forwarding device 202 by using an S18 interface, and the second control information may include, for example, an SPI and a corresponding key. The gateway forwarding device 202 performs processing such as encryption on a data packet (that is, the second data packet) based on the second control information, and sends the encrypted second data packet to a terminal to which the data packet points.

Example 16

In a trusted non-3GPP access scenario, the gateway system functions as a TGW.

Uplink: The gateway controller 201 sends the second control information to the gateway forwarding device 202 by using an S18 interface, and the second control information may include, for example, S2a PGW user plane information (which may also be referred to as PGW user plane information), that is, control information that is used to define a manner of processing a corresponding data packet to be sent from the S2a interface in FIG. 1. For example, the S2a PGW user plane information may be used to define a manner of processing different data packets to be sent from the S2a interface, such as a PDN GW address for the user plane, or a PDN GW TEID of the user plane. The gateway forwarding device 202 performs, based on the S2a PGW user plane information, processing such as encapsulation on a data packet (that is, the second data packet) to be sent from the S2a interface, and sends the encapsulated second data packet to a PGW to which the data packet points.

Downlink: The gateway controller 201 sends the second control information to the gateway forwarding device 202 by using an S18 interface, and the second control information may include, for example, a MAC address of a terminal. The gateway forwarding device 202 performs processing such as encapsulation on a data packet (that is, the second data packet) based on the second control information, and sends the encapsulated second data packet to a terminal to which the data packet points.

In conclusion, in this embodiment of the present invention, the second control information may be used to indicate a specific operation that needs to be performed by the gateway forwarding device 202.

Further, in addition to the specific operation to be performed by the gateway forwarding device 202, the second control information may further indicate processing procedure information for the gateway forwarding device 202 in a processing process.

Optionally, in this embodiment of the present invention, the second control information may include processing procedure information of the second data packet in the gateway forwarding device 202.

As described in the procedure in FIG. 3, the gateway forwarding device 202 may use an object-oriented implementation method. Similarly, the method is also applicable to the method in the procedure in FIG. 5. Objects, atomic actions, and the like abstracted by the gateway forwarding device 202 are described in the procedure in FIG. 3, and details are not described herein again.

Examples are enumerated in the procedure in FIG. 3 to describe a process of forwarding a data packet after a function of the gateway forwarding device 202 is abstracted into objects and atomic actions. The following further uses examples for description.

Example 17

In a 3GPP access scenario, the gateway system functions as an SGW.

Uplink: The gateway controller 201 sends the second control information to the gateway forwarding device 202 by using an S18 interface, and the second control information may include, for example, S5/S8 PGW user plane information (which may also be referred to as PGW user plane information), that is, control information that is used to define a manner of processing a corresponding data packet to be sent from the S5/S8 interface in FIG. 1. For example, the S5/S8 PGW user plane information may be used to define a manner of processing different data packets to be sent from the S5/S8 interface, such as a PDN GW address for the user plane, or a PDN GW TEID of the user plane. A bearer object of the gateway forwarding device 202 encapsulates a to-be-sent data packet (that is, the second data packet) based on the S5/S8 PGW user plane information, for example, performs GTP encapsulation; and then sends the encapsulated second data packet to an interface object. The interface object sends the encapsulated second data packet to a PGW to which the data packet points.

Orchestration information (that is, a data packet traversing sequence) included in the second control information may be:

Bearer_Encapsulate>>Interface_SendPacket

Downlink: The gateway controller 201 sends the second control information to the gateway forwarding device 202 by using an S18 interface, and the second control information may include, for example, S1-U eNB user plane information (which may also be referred to as eNB user plane information), that is, control information that is used to define a manner of processing a corresponding data packet to be sent from the S1-U interface in FIG. 1. For example, the S1-U eNB user plane information may be used to define a manner of processing different data packets to be sent from the S1-U interface, such as an eNB address for the user plane (evolved NodeB address for the user plane) or an eNB TEID of the user plane (evolved NodeB tunnel endpoint identifier of the user plane). A bearer object of the gateway forwarding device 202 encapsulates a to-be-sent data packet (that is, the second data packet) based on the S1-U eNB user plane information, for example, encapsulates the to-be-sent data packet into a GTP data packet; and then sends the encapsulated second data packet to an interface object. The interface object sends the encapsulated second data packet to an eNB to which the data packet points.

Orchestration information (that is, a data packet traversing sequence) included in the second control information may be:

Bearer_Encapsulate>>Interface_SendPacket

Example 18-1

In a 3GPP access scenario, the gateway system functions as a PGW.

Uplink: The gateway controller 201 sends the second control information to the gateway forwarding device 202 by using an S18 interface, that is, control information that is used to define a manner of processing a corresponding IP data packet to be sent from the SGi interface in FIG. 1. It may be considered that the second control information includes a manner of processing a data packet to be sent to a destination address. An interface object of the gateway forwarding device 202 sends, from the SGi interface based on a destination address of the IP data packet, the data packet to an external network element.

Orchestration information included in the second control information may be:

Interface_SendPacket

Downlink: The gateway controller 201 sends the second control information to the gateway forwarding device 202 by using an S18 interface, and the second control information may include, for example, S5/S8 SGW user plane information (which may also be referred to as SGW user plane information), that is, control information that is used to define a manner of processing a corresponding data packet to be sent from the S5/S8 interface in FIG. 1. For example, the S5/S8 SGW user plane information may be used to define a manner of processing different data packets to be sent from the S5/S8 interface, such as an SGW address for the user plane, or an SGW TEID of the user plane. A bearer object of the gateway forwarding device 202 performs, based on the S5/S8 SGW user plane information and according to an attribute of the bearer object carried in the second control information, processing such as encapsulation on a data packet (that is, the second data packet) to be sent from the S5/S8 interface, and sends the encapsulated second data packet to an interface object. The interface object sends the encapsulated second data packet to an SGW to which the data packet points.

Orchestration information included in the second control information may be:

Bearer_Encapsulate>>Interface_SendPacket

Example 18-2

In a 3GPP access scenario, the gateway system functions as a PGW. The PGW sends and receives an L2TP data packet by using an SGi interface.

Uplink: The gateway controller 201 sends the second control information to the gateway forwarding device 202 by using an S18 interface, and the second control information may include, for example, L2TP tunnel information, that is, control information that is used to define a manner of processing a corresponding IP data packet to be sent from the SGi interface in FIG. 1. It may be considered that the second control information includes a manner of processing a data packet to be sent to a destination address. A link object of the gateway forwarding device 202 performs, based on a tunnel ID and a session ID that are of an L2TP tunnel, processing such as encapsulation on a data packet (that is, the second data packet) to be sent from the SGi interface, and sends the encapsulated second data packet to an interface object. The interface object sends the encapsulated second data packet to an external network element to which the data packet points.

Orchestration information included in the second control information may be:

Link_Encapsulate>>Interface_SendPacket

Downlink: The gateway controller 201 sends the second control information to the gateway forwarding device 202 by using an S18 interface, and the second control information may include, for example, S5/S8 SGW user plane information (which may also be referred to as SGW user plane information), that is, control information that is used to define a manner of processing a corresponding data packet to be sent from the S5/S8 interface in FIG. 1. For example, the S5/S8 SGW user plane information may be used to define a manner of processing different data packets to be sent from the S5/S8 interface, such as an SGW address for the user plane, or an SGW TEID of the user plane. A bearer object of the gateway forwarding device 202 performs, based on the S5/S8 SGW user plane information and according to an attribute of the bearer object carried in the second control information, processing such as encapsulation on a data packet (that is, the second data packet) to be sent from the S5/S8 interface, and sends the encapsulated second data packet to an interface object. The interface object sends the encapsulated second data packet to an SGW to which the data packet points.

Orchestration information included in the second control information may be:

Bearer_Encapsulate>>Interface_SendPacket

Example 19

In a 3GPP access scenario, the gateway system functions as a PGW and an SGW. In this case, the PGW and the SGW are a same entity.

Uplink: The gateway controller 201 sends the second control information to the gateway forwarding device 202 by using an S18 interface, that is, control information that is used to define a manner of processing a corresponding IP data packet to be sent from the SGi interface in FIG. 1. It may be considered that the second control information includes a manner of processing a data packet to be sent to a destination address. An interface object of the gateway forwarding device 202 sends, from the SGi interface based on a destination address of the IP data packet, the data packet to an external network element.

Orchestration information included in the second control information may be:

Interface_SendPacket

Downlink: The gateway controller 201 sends the second control information to the gateway forwarding device 202 by using an S18 interface, and the second control information may include, for example, S1-U eNB user plane information (which may also be referred to as eNB user plane information), that is, control information that is used to define a manner of processing a corresponding data packet to be sent from the S1-U interface in FIG. 1. For example, the S1-U eNB user plane information may be used to define a manner of processing different data packets to be sent from the S1-U interface, such as an eNB address for the user plane, or an eNB TEID of the user plane. A bearer object of the gateway forwarding device 202 performs, based on the S1-U eNB user plane information and according to an attribute of the bearer object, processing such as encapsulation on a data packet (that is, the second data packet) to be sent from the S1-U interface, and sends the encapsulated second data packet to an interface object. The interface object sends the encapsulated second data packet to an eNB to which the data packet points.

Orchestration information included in the second control information may be:

Bearer_Encapsulate>>Interface_SendPacket

Example 20

In a 3GPP access scenario, the gateway system functions as an SGW. A data packet between the SGW and a PGW is encapsulated in a PMIP format.

Uplink: The gateway controller 201 sends the second control information to the gateway forwarding device 202 by using an S18 interface. A session object of the gateway forwarding device 202 performs PMIP encapsulation on a to-be-sent data packet (that is, the second data packet) based on the second control information and according to an attribute (for example, a GRE key) of the session object, and then sends the encapsulated second data packet to an interface object. The interface object sends the encapsulated second data packet to a PGW to which the data packet points.

Orchestration information (that is, a data packet traversing sequence) included in the second control information may be:

Session_Encapsulate>>Interface_SendPacket

Downlink: The gateway controller 201 sends the second control information to the gateway forwarding device 202 by using an S18 interface. A bearer object of the gateway forwarding device 202 performs GTP encapsulation on a to-be-sent data packet (that is, the second data packet) based on the second control information, and then sends the encapsulated second data packet to an interface object. The interface object sends the encapsulated second data packet to an eNB to which the data packet points.

Orchestration information (that is, a data packet traversing sequence) included in the second control information may be:

Bearer_Encapsulate>>Interface_SendPacket

Example 21

In an untrusted non-3GPP access scenario, the gateway system functions as an ePDG Uplink: The gateway controller 201 sends the second control information to the gateway forwarding device 202 by using an S18 interface, and the second control information may include, for example, S2b PGW user plane information (which may also be referred to as PGW user plane information), that is, control information that is used to define a manner of processing a corresponding data packet to be sent from the S2b interface in FIG. 1. For example, the S2b PGW user plane information may be used to define a manner of processing different data packets to be sent from the S2b interface, such as a PDN GW address for the user plane, or a PDN GW TEID of the user plane. A bearer object of the gateway forwarding device 202 performs GTP encapsulation on a to-be-sent data packet (that is, the second data packet) based on the S2b PGW user plane information, and sends the encapsulated second data packet to an interface object. The interface object sends the encapsulated second data packet to a PGW to which the data packet points.

Orchestration information in the second control information may be:

Bearer_Encapsulate>>Interface_SendPacket

Downlink: The gateway controller 201 sends the second control information to the gateway forwarding device 202 by using an S18 interface, and the second control information may include, for example, an SPI and a corresponding key. A session object of the gateway forwarding device 202 encrypts a to-be-sent data packet (that is, the second data packet) based on the second control information and according to an attribute (for example, including an SPI and a corresponding key) of the session object, and then sends the encrypted second data packet to an interface object. The interface object sends the encrypted second data packet to a terminal corresponding to the data packet.

Orchestration information included in the second control information may be:

Session_Encrypt>>Interface_SendPacket

Example 22

In a trusted non-3GPP access scenario, the gateway system functions as a TGW.

Uplink: The gateway controller 201 sends the second control information to the gateway forwarding device 202 by using an S18 interface, and the second control information may include, for example, S2a PGW user plane information (which may also be referred to as PGW user plane information), that is, control information that is used to define a manner of processing a corresponding data packet to be sent from the S2a interface in FIG. 1. For example, the S2a PGW user plane information may be used to define a manner of processing different data packets to be sent from the S2a interface, such as a PDN GW address for the user plane, or a PDN GW TEID of the user plane. A bearer object of the gateway forwarding device 202 encapsulates a to-be-sent data packet (that is, the second data packet) based on the second control information, and sends the encapsulated second data packet to an interface object. Then the interface object sends the encapsulated second data packet to a PGW to which the data packet points.

Orchestration information included in the second control information may be:

Bearer_Encapsulate>>Interface_SendPacket

Downlink: The gateway controller 201 sends the second control information to the gateway forwarding device 202 by using an S18 interface, and the second control information may include, for example, a MAC address of a terminal. An interface object of the gateway forwarding device 202 sends the data packet to a corresponding terminal based on the second control information and according to a destination IP (for example, an IP of a terminal) of the to-be-sent data packet.

Orchestration information included in the second control information may be:

Interface_SendPacket

In addition, it should be noted that step numbers in this embodiment of the present invention do not represent an actual step execution sequence. In a specific implementation, all the steps may be executed according to any possible sequence.

The following describes devices in the embodiments of the present invention with reference to the accompanying drawings.

Figure 6:
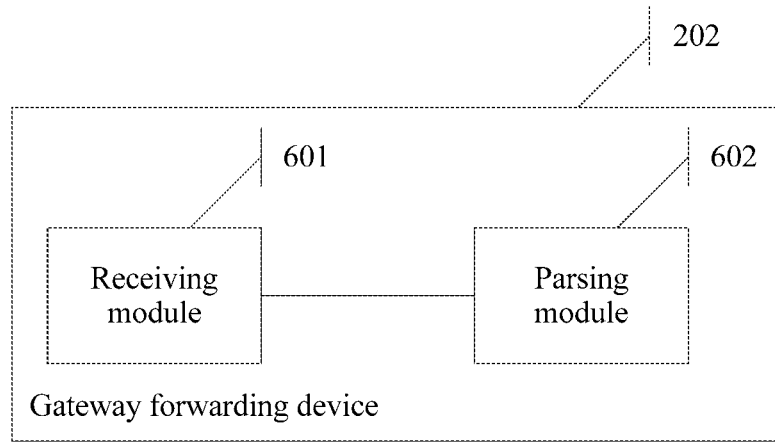
FIG. 6 is a first structural block diagram of a gateway forwarding device according to an embodiment of the present invention.

Referring to FIG. 6, based on a same invention concept, an embodiment of the present invention provides a gateway forwarding device. The gateway forwarding device may be a gateway forwarding device 202. The gateway forwarding device 202 may include a receiving module 601 and a parsing module 602.

The receiving module 601 is configured to receive a first data packet according to first control information generated by a gateway controller 201, where the first control information is used to indicate a manner of processing the first data packet.

The parsing module 602 is configured to parse the first data packet according to the first control information.

Optionally, in this embodiment of the present invention, the first data packet is an uplink data packet or a downlink data packet.

Optionally, in this embodiment of the present invention, the gateway forwarding device 202 and the gateway controller 201 function as an SGW, or the gateway forwarding device 202 and the gateway controller 201 function as an SGW and a PGW, and the first data packet is an uplink data packet.

The receiving module 601 is configured to:

receive the first data packet according to SGW user plane information included in the first control information generated by the gateway controller 201, where the SGW user plane information is used to define a manner of processing a data packet received from an S1-U interface.

The parsing module 602 is configured to:

decapsulate the first data packet according to the SGW user plane information.

Optionally, in this embodiment of the present invention, the receiving module 601 is configured to:

receive the first data packet according to the SGW user plane information by using an interface object, where the interface object is used to receive a data packet from another device; and the parsing module 602 is configured to:

decapsulate the first data packet according to the SGW user plane information by using a link object, where the link object is used to decapsulate a data packet.

Optionally, in this embodiment of the present invention, the gateway forwarding device 202 and the gateway controller 201 function as a PGW, and the first data packet is an uplink data packet.

The receiving module 601 is configured to:

receive the first data packet according to PGW user plane information included in the first control information generated by the gateway controller 201, where the PGW user plane information is used to define a manner of processing a data packet received from an S5/S8 interface.

The parsing module 602 is configured to:

decapsulate the first data packet according to the PGW user plane information.

Optionally, in this embodiment of the present invention, the receiving module 601 is configured to:

receive the first data packet according to the PGW user plane information by using an interface object, where the interface object is used to receive a data packet from another device; and the parsing module 602 is configured to:

decapsulate the first data packet according to the PGW user plane information by using a link object, where the link object is used to decapsulate a data packet.

Optionally, in this embodiment of the present invention, the gateway forwarding device 202 and the gateway controller 201 function as an ePDG and the first data packet is an uplink data packet.

The receiving module 602 is configured to:

receive, according to the first control information generated by the gateway controller 201, the first data packet sent by a terminal.

The parsing module 602 is configured to:

decrypt the first data packet according to an SPI and a corresponding key that are included in the first control information and an SPI of the first data packet.

Optionally, in this embodiment of the present invention, the receiving module 601 is configured to:

receive the first data packet according to the first control information by using an interface object, where the interface object is used to receive a data packet from another device; and the parsing module 602 is configured to:

decrypt, by using a session object, the first data packet according to the SPI and the corresponding key that are included in the first control information and the SPI of the first data packet, where the session object is configured to encapsulate or decapsulate a data packet.

Optionally, in this embodiment of the present invention, the gateway forwarding device 202 and the gateway controller 201 function as a TGW, and the first data packet is an uplink data packet.

The receiving module 601 is configured to:

receive, according to the first control information generated by the gateway controller 201, the first data packet sent by a terminal.

The parsing module 602 is configured to:

parse the first data packet according to a TGW MAC address included in the first control information.

Optionally, in this embodiment of the present invention, the receiving module 601 is configured to receive the first data packet according to the first control information by using an interface object, where the interface object is used to receive a data packet from another device.

Optionally, in this embodiment of the present invention, the gateway forwarding device 202 and the gateway controller 201 function as an SGW, and the first data packet is a downlink data packet.

The receiving module 601 is configured to:

receive the first data packet according to SGW user plane information included in the first control information generated by the gateway controller 201, where the SGW user plane information is used to define a manner of processing a data packet received from an S5/S8 interface.

The parsing module 602 is configured to:

decapsulate the first data packet according to the SGW user plane information.

Optionally, in this embodiment of the present invention, the receiving module 601 is configured to:

receive the first data packet according to the SGW user plane information by using an interface object, where the interface object is used to receive a data packet from another device; and the parsing module 602 is configured to:

decapsulate the first data packet according to the SGW user plane information by using a link object, where the link object is used to decapsulate a data packet.

Optionally, in this embodiment of the present invention, the gateway forwarding device 202 and the gateway controller 201 function as a PGW, and the first data packet is a downlink data packet.

The receiving module 601 is configured to:

receive the first data packet according to terminal user information included in the first control information generated by the gateway controller 201, where the terminal user information is used to define a manner of processing a data packet received from an SGi interface.

The parsing module 602 is configured to:

encapsulate the first data packet according to PGW user plane information included in the first control information, where the PGW user plane information is used to define a manner of processing a data packet received from the SGi interface.

Optionally, in this embodiment of the present invention, the receiving module 601 is configured to:

receive the first data packet according to the terminal user information by using an interface object, where the interface object is used to receive a data packet from another device; and the parsing module 602 is configured to:

encapsulate the first data packet according to the PGW user plane information by using a bearer object, where the bearer object is configured to decapsulate or encapsulate a data packet.

Optionally, in this embodiment of the present invention, the gateway forwarding device 202 and the gateway controller 201 function as an SGW and a PGW, and the first data packet is a downlink data packet.

The receiving module 601 is configured to:

receive the first data packet according to terminal user information included in the first control information generated by the gateway controller 201, where the terminal user information is used to define a manner of processing a data packet received from an SGi interface.

The parsing module 602 is configured to:

encapsulate the first data packet according to eNB user plane information included in the first control information, where the eNB user plane information is used to define a manner of processing a data packet received from the SGi interface.

Optionally, in this embodiment of the present invention, the receiving module 601 is configured to:

receive the first data packet according to the terminal user information by using an interface object, where the interface object is used to receive a data packet from another device; and the parsing module 602 is configured to:

encapsulate the first data packet according to the eNB user plane information by using a bearer object, where the bearer object is configured to decapsulate or encapsulate a data packet.

Optionally, in this embodiment of the present invention, the gateway forwarding device 202 and the gateway controller 201 function as an ePDG, and the first data packet is a downlink data packet.

The receiving module 601 is configured to:

receive the first data packet according to ePDG user plane information included in the first control information generated by the gateway controller 201.

The parsing module 602 is configured to:

decapsulate the first data packet according to the ePDG user plane information.

Optionally, in this embodiment of the present invention, the receiving module 601 is configured to:

receive the first data packet according to the ePDG user plane information by using an interface object, where the interface object is used to receive a data packet from another device; and the parsing module 602 is configured to:

decapsulate the first data packet according to the ePDG user plane information by using a link object, where the link object is used to decapsulate a data packet.

Optionally, in this embodiment of the present invention, the gateway forwarding device 202 and the gateway controller 201 function as a TGW, and the first data packet is a downlink data packet.

The receiving module 601 is configured to:

receive the first data packet according to TGW user plane information included in the first control information generated by the gateway controller 201.

The parsing module 602 is configured to:

decapsulate the first data packet according to the TGW user plane information.

Optionally, in this embodiment of the present invention, the receiving module 601 is configured to:

receive the first data packet according to the TGW user plane information by using an interface object, where the interface object is used to receive a data packet from another device; and the parsing module 602 is configured to:

decapsulate the first data packet according to the TGW user plane information by using a link object, where the link object is used to decapsulate a data packet.

Figure 7:
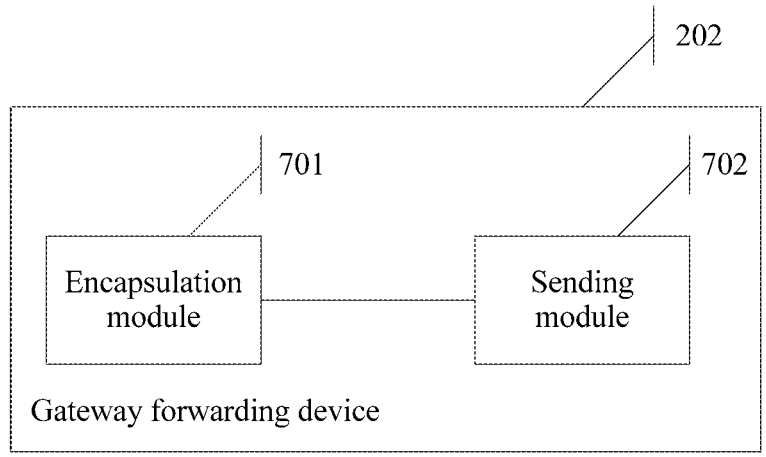
FIG. 7 is a second structural block diagram of a gateway forwarding device according to an embodiment of the present invention.

Referring to FIG. 7, base on a same invention concept, an embodiment of the present invention provides another gateway forwarding device. The gateway forwarding device may be the foregoing gateway forwarding device 202. The gateway forwarding device 202 may include an encapsulation module 701 and a sending module 702.

The encapsulation module 701 is configured to encapsulate a second data packet according to second control information generated by a gateway controller 201, where the second control information is used to indicate a manner of processing the second data packet.

The sending module 702 is configured to send the encapsulated second data packet according to the second control information.

Optionally, in this embodiment of the present invention, the second data packet is an uplink data packet or a downlink data packet.

Optionally, in this embodiment of the present invention, the gateway forwarding device 202 and the gateway controller 201 function as an SGW, and the second data packet is an uplink data packet.

The encapsulation module 701 is configured to:

encapsulate the second data packet according to packet data network gateway PGW user plane information included in the second control information generated by the gateway controller 201, where the PGW user plane information is used to define a manner of processing a data packet to be sent from an S5/S8 interface.

The sending module 702 is configured to:

send the encapsulated second data packet according to the PGW user plane information.

Optionally, in this embodiment of the present invention, the encapsulation module 701 is configured to:

encapsulate the second data packet according to the PGW user plane information by using a bearer object, where the bearer object is configured to decapsulate or encapsulate a data packet; and the sending module 702 is configured to:

send the encapsulated second data packet according to the PGW user plane information by using an interface object, where the interface object is configured to send a data packet to another device.

Optionally, in this embodiment of the present invention, the gateway forwarding device 202 and the gateway controller 201 function as a PGW, and the second data packet is an uplink data packet.

The encapsulation module 701 is configured to:

encapsulate the second data packet according to L2TP tunnel information included in the second control information generated by the gateway controller 201, where the L2TP tunnel information is used to define a manner of processing a data packet to be sent from an SGi interface.

The sending module 702 is configured to:

send the encapsulated second data packet according to the L2TP tunnel information.

Optionally, in this embodiment of the present invention, the encapsulation module 701 is configured to:

encapsulate the second data packet according to the L2TP tunnel information by using a link object, where the link object is used to encapsulate a data packet; and the sending module 702 is configured to:

send the encapsulated second data packet according to the L2TP tunnel information by using an interface object, where the interface object is configured to send a data packet to another device.

Optionally, in this embodiment of the present invention, the gateway forwarding device 202 and the gateway controller 201 function as an ePDG, and the second data packet is an uplink data packet.

The encapsulation module 701 is configured to:

encapsulate the second data packet according to PGW user plane information included in the second control information, where the PGW user plane information is used to define a manner of processing a data packet to be sent from an S2b interface.

The sending module 702 is configured to:

send the encapsulated second data packet according to the PGW user plane information.

Optionally, in this embodiment of the present invention, the encapsulation module 701 is configured to:

encapsulate the second data packet according to the PGW user plane information by using a bearer object, where the bearer object is configured to decapsulate or encapsulate a data packet; and the sending module 702 is configured to:

send the encapsulated second data packet according to the PGW user plane information by using an interface object, where the interface object is configured to send a data packet to another device.

Optionally, in this embodiment of the present invention, the gateway forwarding device 202 and the gateway controller 201 function as a TGW, and the second data packet is an uplink data packet.

The encapsulation module 701 is configured to:

encapsulate the second data packet according to PGW user plane information included in the second control information, where the PGW user plane information is used to define a manner of processing a data packet to be sent from an S2a interface.

The sending module 702 is configured to:

send the encapsulated second data packet according to the PGW user plane information.

Optionally, in this embodiment of the present invention, the encapsulation module 701 is configured to:

encapsulate the second data packet according to the PGW user plane information by using a bearer object, where the bearer object is configured to decapsulate or encapsulate a data packet; and the sending module 702 is configured to:

send the encapsulated second data packet according to the PGW user plane information by using an interface object, where the interface object is configured to send a data packet to another device.

Optionally, in this embodiment of the present invention, the gateway forwarding device 202 and the gateway controller 201 function as an SGW, and the second data packet is a downlink data packet.

The encapsulation module 701 is configured to:

encapsulate the second data packet according to eNB user plane information included in the second control information, where the eNB user plane information is used to define a manner of processing a data packet to be sent from an S1-U interface.

The sending module 702 is configured to:

send the encapsulated second data packet according to the eNB user plane information.

Optionally, in this embodiment of the present invention, the encapsulation module 701 is configured to:

encapsulate the second data packet according to the eNB user plane information by using a bearer object, where the bearer object is configured to decapsulate or encapsulate a data packet; and the sending module 702 is configured to:

send the encapsulated second data packet according to the eNB user plane information by using an interface object, where the interface object is configured to send a data packet to another device.

Optionally, in this embodiment of the present invention, the gateway forwarding device 202 and the gateway controller 201 function as a PGW, and the second data packet is a downlink data packet.

The encapsulation module 701 is configured to:

encapsulate the second data packet according to SGW user plane information included in the second control information, where the SGW user plane information is used to define a manner of processing a data packet to be sent from an S5/S8 interface.

The sending module 702 is configured to:

send the encapsulated second data packet according to the SGW user plane information.

Optionally, in this embodiment of the present invention, the encapsulation module 701 is configured to:

encapsulate the second data packet according to the SGW user plane information by using a bearer object, where the bearer object is configured to decapsulate or encapsulate a data packet; and the sending module 702 is configured to:

send the encapsulated second data packet according to the SGW user plane information by using an interface object, where the interface object is configured to send a data packet to another device.

Optionally, in this embodiment of the present invention, the gateway forwarding device 202 and the gateway controller 201 function as an SGW and a PGW, and the second data packet is a downlink data packet.

The encapsulation module 701 is configured to:

encapsulate the second data packet according to eNB user plane information included in the second control information, where the eNB user plane information is used to define a manner of processing a data packet to be sent from an S1-U interface.

The sending module 702 is configured to:

send the encapsulated second data packet according to the eNB user plane information.

Optionally, in this embodiment of the present invention, the encapsulation module 701 is configured to:

encapsulate the second data packet according to the eNB user plane information by using a bearer object, where the bearer object is configured to decapsulate or encapsulate a data packet; and the sending module 702 is configured to:

send the encapsulated second data packet according to the eNB user plane information by using an interface object, where the interface object is configured to send a data packet to another device.

Optionally, in this embodiment of the present invention, the gateway forwarding device 202 and the gateway controller 201 function as an ePDG, and the second data packet is a downlink data packet.

The encapsulation module 701 is configured to:

encapsulate the second data packet according to an SPI and a corresponding key that are included in the second control information, and encrypt the encapsulated second data packet.

The sending module 702 is configured to:

send the encrypted data packet according to the SPI and the corresponding key.

Optionally, in this embodiment of the present invention, the encapsulation module 701 is configured to:

encapsulate the second data packet according to the SPI and the corresponding key by using a session object; and encrypt the encapsulated second data packet, where the session object is configured to encapsulate or decapsulate, and encrypt a data packet; and the sending module 702 is configured to:

send the encrypted data packet according to the SPI and the corresponding key by using an interface object, where the interface object is configured to send a data packet to another device.

Optionally, in this embodiment of the present invention, the gateway forwarding device 202 and the gateway controller 201 function as a TGW, and the second data packet is a downlink data packet.

The encapsulation module 701 is configured to:

encapsulate the second data packet according to a MAC address of a terminal included in the second control information.

The sending module 702 is configured to:

send the encapsulated second data packet according to the MAC address of the terminal.

Figure 8:
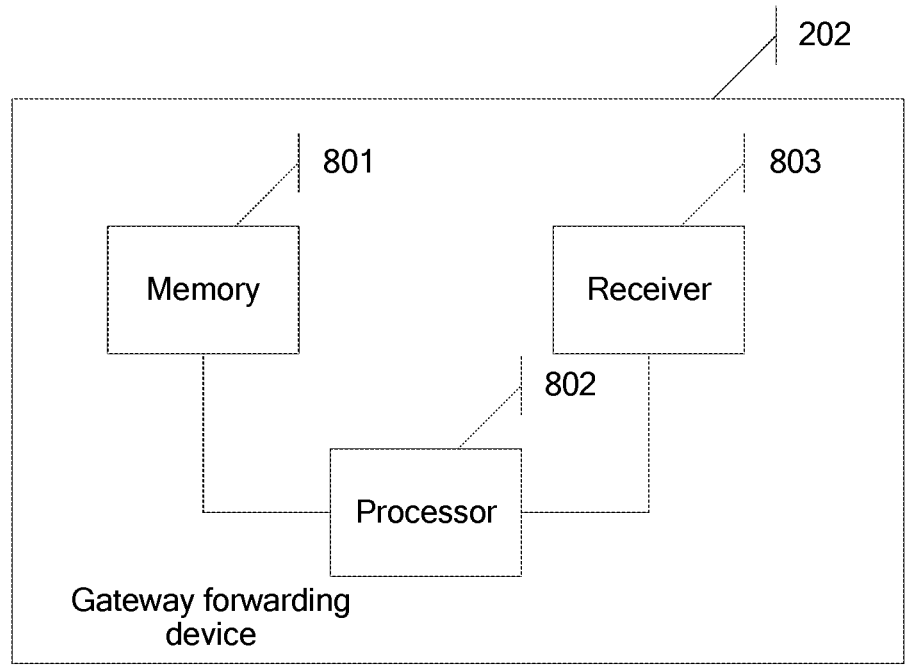
FIG. 8 is a first schematic structural diagram of a gateway forwarding device according to an embodiment of the present invention.

Referring to FIG. 8, base on a same invention concept, an embodiment of the present invention provides a gateway forwarding device. The gateway forwarding device may be the foregoing gateway forwarding device 202. The gateway forwarding device 202 may include a memory 801, a processor 802, and a receiver 803. The processor 802 may be specifically a central processing unit, an application-specific integrated circuit (ASIC), or may be one or more integrated circuits configured to control program execution, or may be a hardware circuit developed by using an field programmable gate array (FPGA), or may be baseband chip. There may be one or more processors 801. The memory 801 may include a read-only memory (ROM), a random access memory (RAM), and a magnetic disk storage. The receiver 803 may belong to a radio frequency system. The receiver 803 is configured to perform network communication with an external device, and may specifically communicate with the external device by using a network such as the Ethernet, a radio access network, or a wireless local area network. The memory 801 and the receiver 803 each may be connected to the processor 802, for example, may be connected to the processor 802 by using a dedicated connection cable, or by using a bus.

The memory 801 is configured to store an instruction that is required when the processor 802 executes a task.

The receiver 803 is configured to receive a first data packet according to first control information generated by a gateway controller 201, where the first control information is used to indicate a manner of processing the first data packet.

The processor 802 is configured to execute the instruction stored by the memory 801, so as to parse the first data packet according to the first control information.

Optionally, in this embodiment of the present invention, the first data packet is an uplink data packet or a downlink data packet.

Optionally, in this embodiment of the present invention, the gateway forwarding device 202 and the gateway controller 201 function as an SGW, or the gateway forwarding device 202 and the gateway controller 201 function as an SGW and a PGW, and the first data packet is an uplink data packet.

The receiver 803 is configured to:

receive the first data packet according to SGW user plane information included in the first control information generated by the gateway controller 201, where the SGW user plane information is used to define a manner of processing a data packet received from an S1-U interface.

The processor 802 is configured to:

decapsulate the first data packet according to the SGW user plane information.

Optionally, in this embodiment of the present invention, the receiver 803 is configured to:

receive the first data packet according to the SGW user plane information by using an interface object, where the interface object is used to receive a data packet from another device; and the processor 802 is configured to:

decapsulate the first data packet according to the SGW user plane information by using a link object, where the link object is used to decapsulate a data packet.

Optionally, in this embodiment of the present invention, the gateway forwarding device 202 and the gateway controller 201 function as a PGW, and the first data packet is an uplink data packet.

The receiver 803 is configured to:

receive the first data packet according to PGW user plane information included in the first control information generated by the gateway controller 201, where the PGW user plane information is used to define a manner of processing a data packet received from an S5/S8 interface.

The processor 802 is configured to:

decapsulate the first data packet according to the PGW user plane information.

Optionally, in this embodiment of the present invention, the receiver 803 is configured to:

receive the first data packet according to the PGW user plane information by using an interface object, where the interface object is used to receive a data packet from another device; and the processor 802 is configured to:

decapsulate the first data packet according to the PGW user plane information by using a link object, where the link object is used to decapsulate a data packet.

Optionally, in this embodiment of the present invention, the gateway forwarding device 202 and the gateway controller 201 function as an ePDG and the first data packet is an uplink data packet.

The receiver 803 is configured to:

receive, according to the first control information generated by the gateway controller 201, the first data packet sent by a terminal.

The processor 802 is configured to:

decrypt the first data packet according to an SPI and a corresponding key that are included in the first control information and an SPI of the first data packet.

Optionally, in this embodiment of the present invention, the receiver 803 is configured to:

receive the first data packet according to the first control information by using an interface object, where the interface object is used to receive a data packet from another device; and the processor 802 is configured to:

decrypt, by using a session object, the first data packet according to the SPI and the corresponding key that are included in the first control information and the SPI of the first data packet, where the session object is configured to encapsulate or decapsulate a data packet.

Optionally, in this embodiment of the present invention, the gateway forwarding device 202 and the gateway controller 201 function as a TGW, and the first data packet is an uplink data packet.

The receiver 803 is configured to:

receive, according to the first control information generated by the gateway controller 201, the first data packet sent by a terminal.

The processor 802 is configured to:

parse the first data packet according to a TGW MAC address included in the first control information.

Optionally, in this embodiment of the present invention, the receiver 803 is configured to:

receive the first data packet according to the first control information by using an interface object, where the interface object is used to receive a data packet from another device.

Optionally, in this embodiment of the present invention, the gateway forwarding device 202 and the gateway controller 201 function as an SGW, and the first data packet is a downlink data packet.

The receiver 803 is configured to:

receive the first data packet according to SGW user plane information included in the first control information generated by the gateway controller 201, where the SGW user plane information is used to define a manner of processing a data packet received from an S5/S8 interface.

The processor 802 is configured to:

decapsulate the first data packet according to the SGW user plane information.

Optionally, in this embodiment of the present invention, the receiver 803 is configured to:

receive the first data packet according to the SGW user plane information by using an interface object, where the interface object is used to receive a data packet from another device; and the processor 802 is configured to:

decapsulate the first data packet according to the SGW user plane information by using a link object, where the link object is used to decapsulate a data packet.

Optionally, in this embodiment of the present invention, the gateway forwarding device 202 and the gateway controller 201 function as a PGW, and the first data packet is a downlink data packet.

The receiver 803 is configured to:

receive the first data packet according to terminal user information included in the first control information generated by the gateway controller 201, where the terminal user information is used to define a manner of processing a data packet received from an SGi interface.

The processor 802 is configured to:

encapsulate the first data packet according to PGW user plane information included in the first control information, where the PGW user plane information is used to define a manner of processing a data packet received from the SGi interface.

Optionally, in this embodiment of the present invention, the receiver 803 is configured to:

receive the first data packet according to the terminal user information by using an interface object, where the interface object is used to receive a data packet from another device; and the processor 802 is configured to:

encapsulate the first data packet according to the PGW user plane information by using a bearer object, where the bearer object is configured to decapsulate or encapsulate a data packet.

Optionally, in this embodiment of the present invention, the gateway forwarding device 202 and the gateway controller 201 function as an SGW and a PGW, and the first data packet is a downlink data packet.

The receiver 803 is configured to:

receive the first data packet according to terminal user information included in the first control information generated by the gateway controller 201, where the terminal user information is used to define a manner of processing a data packet received from an SGi interface.

The processor 802 is configured to:

encapsulate the first data packet according to eNB user plane information included in the first control information, where the eNB user plane information is used to define a manner of processing a data packet received from the SGi interface.

Optionally, in this embodiment of the present invention, the receiver 803 is configured to:

receive the first data packet according to the terminal user information by using an interface object, where the interface object is used to receive a data packet from another device; and the processor 802 is configured to:

encapsulate the first data packet according to the eNB user plane information by using a bearer object, where the bearer object is configured to decapsulate or encapsulate a data packet.

Optionally, in this embodiment of the present invention, the gateway forwarding device 202 and the gateway controller 201 function as an ePDG, and the first data packet is a downlink data packet.

The receiver 803 is configured to:

receive the first data packet according to ePDG user plane information included in the first control information generated by the gateway controller 201.

The processor 802 is configured to:

decapsulate the first data packet according to the ePDG user plane information.

Optionally, in this embodiment of the present invention, the receiver 803 is configured to:

receive the first data packet according to the ePDG user plane information by using an interface object, where the interface object is used to receive a data packet from another device; and the processor 802 is configured to:

decapsulate the first data packet according to the ePDG user plane information by using a link object, where the link object is used to decapsulate a data packet.

Optionally, in this embodiment of the present invention, the gateway forwarding device 202 and the gateway controller 201 function as a TGW, and the first data packet is a downlink data packet.

The receiver 803 is configured to:

receive the first data packet according to TGW user plane information included in the first control information generated by the gateway controller 201.

The processor 802 is configured to:

decapsulate the first data packet according to the TGW user plane information.

Optionally, in this embodiment of the present invention, the receiver 803 is configured to:

receive the first data packet according to the TGW user plane information by using an interface object, where the interface object is used to receive a data packet from another device; and the processor 802 is configured to:

decapsulate the first data packet according to the TGW user plane information by using a link object, where the link object is used to decapsulate a data packet.

Figure 9:
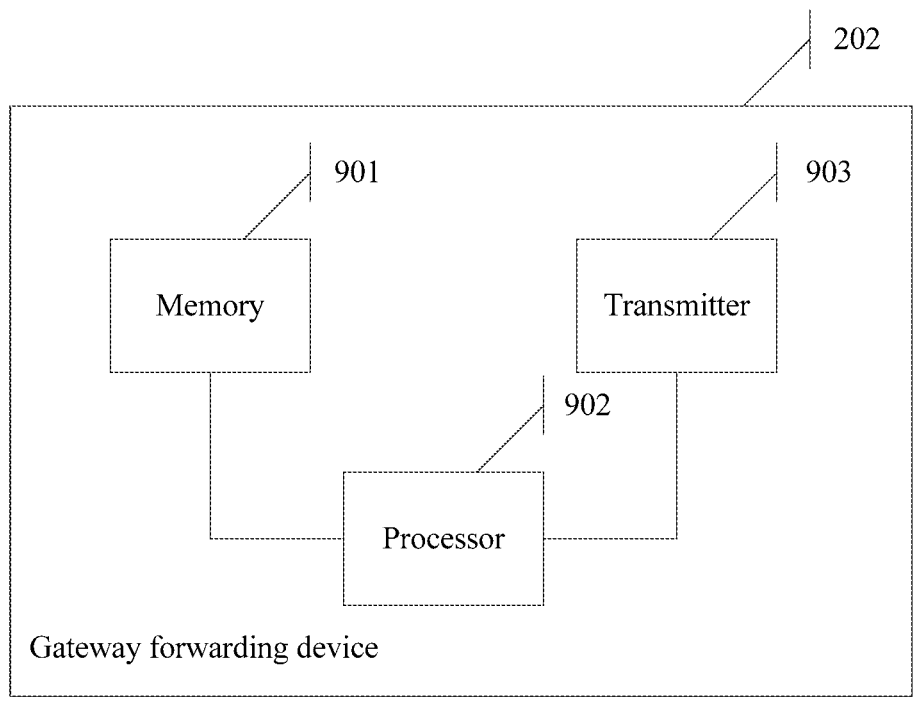
FIG. 9 is a second schematic structural diagram of a gateway forwarding device according to an embodiment of the present invention.

Referring to FIG. 9, base on a same invention concept, an embodiment of the present invention provides another gateway forwarding device. The gateway forwarding device may be the foregoing gateway forwarding device 202. The gateway forwarding device 202 may include a memory 901, a processor 902, and a transmitter 903. The processor 902 may be specifically a central processing unit, an ASIC, one or more integrated circuits configured to control program execution, a hardware circuit developed by using an FPGA, or a baseband chip. There may be one or more memories 901. The memory 901 may include a ROM, a RAM, and a magnetic disk storage. The transmitter 903 may belong to a radio frequency system. The transmitter 903 is configured to perform network communication with an external device, and may specifically communicate with the external device by using a network such as the Ethernet, a radio access network, or a wireless local area network. The memory 901 and the transmitter 903 each may be connected to the processor 902, for example, may be connected to the processor 902 by using a dedicated connection cable, or by using a bus.

The memory 901 is configured to store an instruction that is required when the processor 902 executes a task.

The processor 902 is configured to execute the instruction stored by the memory 901, so as to: encapsulate a second data packet according to second control information generated by a gateway controller 201, where the second control information is used to indicate a manner of processing the second data packet; and send the encapsulated second data packet according to the second control information by using the transmitter 903.

Optionally, in this embodiment of the present invention, the second data packet is an uplink data packet or a downlink data packet.

Optionally, in this embodiment of the present invention, the gateway forwarding device 202 and the gateway controller 201 function as an SGW, and the second data packet is an uplink data packet.

The processor 902 is configured to:

encapsulate the second data packet according to PGW user plane information included in the second control information generated by the gateway controller 201, where the PGW user plane information is used to define a manner of processing a data packet to be sent from an S5/S8 interface; and send the encapsulated second data packet according to the PGW user plane information by using the transmitter 903.

Optionally, in this embodiment of the present invention, the processor 902 is configured to:

encapsulate the second data packet according to the PGW user plane information by using a bearer object, where the bearer object is configured to decapsulate or encapsulate a data packet; and send the encapsulated second data packet according to the PGW user plane information by using an interface object and the transmitter 903, where the interface object is configured to send a data packet to another device.

Optionally, in this embodiment of the present invention, the gateway forwarding device 202 and the gateway controller 201 function as a PGW, and the second data packet is an uplink data packet.

The processor 902 is configured to:

encapsulate the second data packet according to L2TP tunnel information included in the second control information generated by the gateway controller 201, where the L2TP tunnel information is used to define a manner of processing a data packet to be sent from an SGi interface; and send the encapsulated second data packet according to the L2TP tunnel information by using the transmitter 903.

Optionally, in this embodiment of the present invention, the processor 902 is configured to:

encapsulate the second data packet according to the L2TP tunnel information by using a link object, where the link object is used to encapsulate a data packet; and send the encapsulated second data packet according to the L2TP tunnel information by using an interface object and the transmitter 903, where the interface object is configured to send a data packet to another device.

Optionally, in this embodiment of the present invention, the gateway forwarding device 202 and the gateway controller 201 function as an ePDG, and the second data packet is an uplink data packet.

The processor 902 is configured to:

encapsulate the second data packet according to PGW user plane information included in the second control information, where the PGW user plane information is used to define a manner of processing a data packet to be sent from an S2b interface; and send the encapsulated second data packet according to the PGW user plane information by using the transmitter 903.

Optionally, in this embodiment of the present invention, the processor 902 is configured to:

encapsulate the second data packet according to the PGW user plane information by using a bearer object, where the bearer object is configured to decapsulate or encapsulate a data packet; and send the encapsulated second data packet according to the PGW user plane information by using an interface object and the transmitter 903, where the interface object is configured to send a data packet to another device.

Optionally, in this embodiment of the present invention, the gateway forwarding device 202 and the gateway controller 201 function as a TGW, and the second data packet is an uplink data packet.

The processor 902 is configured to:

encapsulate the second data packet according to PGW user plane information included in the second control information, where the PGW user plane information is used to define a manner of processing a data packet to be sent from an S2a interface; and send the encapsulated second data packet according to the PGW user plane information by using the transmitter 903.

Optionally, in this embodiment of the present invention, the processor 902 is configured to:

encapsulate the second data packet according to the PGW user plane information by using a bearer object, where the bearer object is configured to decapsulate or encapsulate a data packet; and send the encapsulated second data packet according to the PGW user plane information by using an interface object and the transmitter 903, where the interface object is configured to send a data packet to another device.

Optionally, in this embodiment of the present invention, the gateway forwarding device 202 and the gateway controller 201 function as an SGW, and the second data packet is a downlink data packet.

The processor 902 is configured to:

encapsulate the second data packet according to eNB user plane information included in the second control information, where the eNB user plane information is used to define a manner of processing a data packet to be sent from an S1-U interface; and send the encapsulated second data packet according to the eNB user plane information by using the transmitter 903.

Optionally, in this embodiment of the present invention, the processor 902 is configured to:

encapsulate the second data packet according to the eNB user plane information by using a bearer object, where the bearer object is configured to decapsulate or encapsulate a data packet; and send the encapsulated second data packet according to the eNB user plane information by using an interface object and the transmitter 903, where the interface object is configured to send a data packet to another device.

Optionally, in this embodiment of the present invention, the gateway forwarding device 202 and the gateway controller 201 function as a PGW, and the second data packet is a downlink data packet.

The processor 902 is configured to:

encapsulate the second data packet according to SGW user plane information included in the second control information, where the SGW user plane information is used to define a manner of processing a data packet to be sent from an S5/S8 interface; and send the encapsulated second data packet according to the SGW user plane information by using the transmitter 903.

Optionally, in this embodiment of the present invention, the processor 902 is configured to:

encapsulate the second data packet according to the SGW user plane information by using a bearer object, where the bearer object is configured to decapsulate or encapsulate a data packet; and send the encapsulated second data packet according to the SGW user plane information by using an interface object and the transmitter 903, where the interface object is configured to send a data packet to another device.

Optionally, in this embodiment of the present invention, the gateway forwarding device 202 and the gateway controller 201 function as an SGW and a PGW, and the second data packet is a downlink data packet.

The processor 902 is configured to:

encapsulate the second data packet according to eNB user plane information included in the second control information, where the eNB user plane information is used to define a manner of processing a data packet to be sent from an S1-U interface; and send the encapsulated second data packet according to the eNB user plane information by using the transmitter 903.

Optionally, in this embodiment of the present invention, the processor 902 is configured to:

encapsulate the second data packet according to the eNB user plane information by using a bearer object, where the bearer object is configured to decapsulate or encapsulate a data packet; and send the encapsulated second data packet according to the eNB user plane information by using an interface object and the transmitter 903, where the interface object is configured to send a data packet to another device.

Optionally, in this embodiment of the present invention, the gateway forwarding device 202 and the gateway controller 201 function as an ePDG; and the second data packet is a downlink data packet.

The processor 902 is configured to:

encapsulate the second data packet according to an SPI and a corresponding key that are included in the second control information; encrypt the encapsulated second data packet; and send the encrypted data packet according to the SPI and the corresponding key by using the transmitter 903.

Optionally, in this embodiment of the present invention, the processor 902 is configured to:

encapsulate the second data packet according to the SPI and the corresponding key by using a session object; encrypt the encapsulated second data packet, where the session object is configured to encapsulate or decapsulate, and encrypt a data packet; and send the encrypted data packet according to the SPI and the corresponding key by using an interface object and the transmitter 903, where the interface object is configured to send a data packet to another device.

Optionally, in this embodiment of the present invention, the gateway forwarding device 202 and the gateway controller 201 function as a TGW, and the second data packet is a downlink data packet.

The processor 902 is configured to:

encapsulate the second data packet according to a MAC address of a terminal included in the second control information; and send the encapsulated second data packet according to the MAC address of the terminal by using the transmitter 903.

An embodiment of the present invention provides a gateway system. In the gateway system, a control plane is separated from a forwarding plane. A gateway controller 201 is configured to complete a control function, and may control respective generation of control information for data packets of multiple different protocol types (that is, control information corresponding to different network standards). A gateway forwarding device 202 is responsible for forwarding, and may be controlled by the gateway controller 201 to receive and send data packets of various protocol types (that is, receive and send data packets corresponding to different network standards), for example, may receive and send a GTP data packet or a GRE data packet, so that the gateway system can be applicable to various network standards without deploying different gateways for multiple different network standards, and system overheads are reduced. In addition, in a multi-standard access architecture, only one or few such gateway systems may need to be accessed without accessing multiple different gateways, thereby simplifying a network topology structure, and facilitating network maintenance.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present application. The foregoing storage medium includes: any medium that can store program code, such as a Universal Serial Bus (USB) flash drive, a removable hard disk, a ROM, a RAM, a magnetic disk, or an optical disc.

The foregoing embodiments are merely used to describe technical solutions of the present application. The foregoing embodiments are merely intended to help understand exemplary embodiments of the present invention, and shall not be construed as a limitation on the present invention. Any variation or replacement readily figured out by a person skilled in the art within the technical scope disclosed in the present invention shall fall within the protection scope of the present invention. Additionally, statements made herein characterizing the invention refer to an embodiment of the invention and not necessarily all embodiments.

What is claimed is:

1. A gateway forwarding device of a gateway system, comprising:
    a processor; and
    a non-transitory computer readable storage medium having processor-executable instructions stored thereon;
    wherein the processor is configured to execute the processor-executable instructions to facilitate the following:

receiving, by the gateway forwarding device, a first data packet corresponding to a first type of communication protocol, wherein the first type of communication protocol corresponds to a first network standard, wherein the first network standard is a 3GPP network standard, a trusted non-3GPP network standard, or an untrusted non-3GPP network standard;
    receiving, by the gateway forwarding device, a second data packet corresponding to a second type of communication protocol, wherein the second type of communication protocol corresponds to a second network standard different from the first network standard, and the second network standard is a 3GPP network standard, a trusted non-3GPP network standard, or an untrusted non-3GPP network standard;
    receiving, by the gateway forwarding device, first control information corresponding to the first network standard and second control information corresponding to the second network standard generated by a gateway controller of the gateway system, wherein the first control information indicates a manner of processing the first data packet and the second control information indicates a manner of processing the second data packet; and
    parsing, by the gateway forwarding device, the first data packet according to the first control information and the second data packet according to the second control information;
    wherein in the gateway system, a control plane is separated from a forwarding plane, wherein the gateway controller is part of the control plane and the gateway forwarding device is part of the forwarding plane; and
    wherein the gateway forwarding device is configured to act as a serving gateway (SGW) in a 3GPP access scenario, a packet data network gateway (PGW) in another 3GPP access scenario, a trusted access gateway (TGW) in a trusted non-3GPP access scenario, and an evolved packet data gateway (ePDG) in an untrusted non-3GPP access scenario.

2. The device according to claim 1, wherein the first data packet is an uplink data packet or a downlink data packet.

3. The device according to claim 2, wherein the first data packet is an uplink data packet;
    wherein receiving the first data packet further comprises: receiving, by the gateway forwarding device, the first data packet according to SGW user plane information comprised in the first control information generated by the gateway controller, wherein the SGW user plane information defines a manner of processing a data packet received from an S1-U interface; and
    wherein parsing the first data packet according to the first control information further comprises: decapsulating, by the gateway forwarding device, the first data packet according to the SGW user plane information.

4. The device according to claim 3, wherein receiving the first data packet further comprises: receiving, by an interface object of the gateway forwarding device, the first data packet according to the SGW user plane information, wherein the interface object is for receiving a data packet from another device; and
    wherein decapsulating the first data packet according to the SGW user plane information further comprises: decapsulating, by a link object of the gateway forwarding device, the first data packet according to the SGW user plane information, wherein the link object is for decapsulating a data packet.

5. The device according to claim 2, wherein the first data packet is an uplink data packet;
- wherein receiving the first data packet further comprises: receiving, by the gateway forwarding device, the first data packet according to PGW user plane information comprised in the first control information generated by the gateway controller, wherein the PGW user plane information corresponds to a manner of processing a data packet received from an S5/S8 interface; and
- wherein parsing the first data packet according to the first control information further comprises: decapsulating, by the gateway forwarding device, the first data packet according to the PGW user plane information.

6. The device according to claim 5, wherein receiving the first data packet further comprises: receiving, by an interface object of the gateway forwarding device, the first data packet according to the PGW user plane information, wherein the interface object is for receiving a data packet from another device; and
- wherein decapsulating the first data packet according to the PGW user plane information further comprises: decapsulating, by a link object of the gateway forwarding device, the first data packet according to the PGW user plane information, wherein the link object is for decapsulating a data packet.

7. The device according to claim 2, wherein the first data packet is a downlink data packet;
- wherein receiving the first data packet further comprises: receiving, by the gateway forwarding device, the first data packet according to SGW user plane information comprised in the first control information generated by the gateway controller, wherein the SGW user plane information defines a manner of processing a data packet received from an S5/S8 interface; and
- wherein parsing the first data packet according to the first control information further comprises: decapsulating, by the gateway forwarding device, the first data packet according to the SGW user plane information.

8. The device according to claim 7, wherein receiving the first data packet further comprises: receiving, by an interface object of the gateway forwarding device, the first data packet according to the SGW user plane information, wherein the interface object is for receiving a data packet from another device; and
- wherein decapsulating the first data packet according to the SGW user plane information further comprises: decapsulating, by a link object of the gateway forwarding device, the first data packet according to the SGW user plane information, wherein the link object is for decapsulating a data packet.

9. The device according to claim 2, wherein the first data packet is a downlink data packet;
- wherein receiving the first data packet further comprises: receiving, by the gateway forwarding device, the first data packet according to terminal user information comprised in the first control information generated by the gateway controller, wherein the terminal user information defines a manner of processing a data packet received from an SGi interface; and
- wherein parsing the first data packet according to the first control information further comprises: encapsulating, by the gateway forwarding device, the first data packet according to PGW user plane information comprised in the first control information, wherein the PGW user plane information defines a manner of processing a data packet received from the SGi interface.

10. The device according to claim 9, wherein receiving the first data packet further comprises: receiving, by an interface object of the gateway forwarding device, the first data packet according to the terminal user information, wherein the interface object is for receiving a data packet from another device; and
- wherein encapsulating the first data packet according to PGW user plane information comprised in the first control information further comprises: encapsulating, by a bearer object of the gateway forwarding device, the first data packet according to the PGW user plane information, wherein the bearer object is configured to decapsulate or encapsulate a data packet.

11. The device according to claim 2, wherein the first data packet is a downlink data packet;
- wherein receiving the first data packet further comprises: receiving, by the gateway forwarding device, the first data packet according to terminal user information comprised in the first control information generated by the gateway controller, wherein the terminal user information defines a manner of processing a data packet received from an SGi interface; and
- wherein parsing, by the gateway forwarding device, the first data packet according to the first control information further comprises: encapsulating, by the gateway forwarding device, the first data packet according to evolved node B (eNB) user plane information comprised in the first control information, wherein the eNB user plane information defines a manner of processing a data packet received from the SGi interface.

12. The device according to claim 11, wherein receiving the first data packet further comprises: receiving, by an interface object of the gateway forwarding device, the first data packet according to the terminal user information, wherein the interface object is for receiving a data packet from another device; and
- wherein encapsulating the first data packet according to eNB user plane information comprised in the first control information further comprises: encapsulating, by a bearer object of the gateway forwarding device, the first data packet according to the eNB user plane information, wherein the bearer object is configured to decapsulate or encapsulate a data packet.

13. A data packet processing method, comprising:
- receiving, by a gateway forwarding device of a gateway system, a first data packet corresponding to a first type of communication protocol, wherein the first type of communication protocol corresponds to a first network standard, wherein the first network standard is a 3GPP network standard, a trusted non-3GPP network standard, or an untrusted non-3GPP network standard;
- receiving, by the gateway forwarding device, a second data packet corresponding to a second type of communication protocol, wherein the second type of communication protocol corresponds to a second network standard different from the first network standard, and the second network standard is a 3GPP network standard, a trusted non-3GPP network standard, or an untrusted non-3GPP network standard;
- receiving, by the gateway forwarding device, first control information corresponding to the first network standard and second control information corresponding to the second network standard generated by a gateway controller of the gateway system, wherein the first control information indicates a manner of processing the first data packet and the second control information indicates a manner of processing the second data packet; and parsing, by the gateway forwarding device, the first data packet according to the first control information and the second data packet according to the second control information;

wherein in the gateway system, a control plane is separated from a forwarding plane, wherein the gateway controller is part of the control plane and the gateway forwarding device is part of the forwarding plane; and wherein the gateway forwarding device is configured to act as a serving gateway (SGW) in a 3GPP access scenario, a packet data network gateway (PGW) in another 3GPP access scenario, a trusted access gateway (TGW) in a trusted non-3GPP access scenario, and an evolved packet data gateway (ePDG) in an untrusted non-3GPP access scenario.

14. The method according to claim 13, wherein the first data packet is an uplink data packet or a downlink data packet.

15. The method according to claim 14, wherein the first data packet is an uplink data packet;

wherein receiving the first data packet further comprises: receiving, by the gateway forwarding device, the first data packet according to SGW user plane information comprised in the first control information generated by the gateway controller, wherein the SGW user plane information corresponds to a manner of processing a data packet received from an S1-U interface; and wherein parsing the first data packet according to the first control information further comprises: decapsulating, by the gateway forwarding device, the first data packet according to the SGW user plane information.

16. The method according to claim 14, wherein the first data packet is an uplink data packet;

wherein receiving the first data packet further comprises: receiving, by the gateway forwarding device, the first data packet according to PGW user plane information comprised in the first control information generated by the gateway controller, wherein the PGW user plane information corresponds to a manner of processing a data packet received from an S5/S8 interface; and wherein parsing the first data packet according to the first control information comprises: decapsulating, by the gateway forwarding device, the first data packet according to the PGW user plane information.

17. The method according to claim 14, wherein first data packet is a downlink data packet;

wherein receiving the first data packet further comprises: receiving, by the gateway forwarding device, the first data packet according to SGW user plane information comprised in the first control information generated by the gateway controller, wherein the SGW user plane information corresponds to a manner of processing a data packet received from an S5/S8 interface; and wherein parsing the first data packet according to the first control information further comprises: decapsulating, by the gateway forwarding device, the first data packet according to the SGW user plane information.

18. The method according to claim 14, wherein the first data packet is a downlink data packet;

wherein receiving the first data packet further comprises: receiving, by the gateway forwarding device, the first data packet according to terminal user information comprised in the first control information generated by the gateway controller, wherein the terminal user information corresponds to a manner of processing a data packet received from an SGi interface; and wherein parsing the first data packet according to the first control information comprises: encapsulating, by the gateway forwarding device, the first data packet according to PGW user plane information comprised in the first control information, wherein the PGW user plane information is used to define a manner of processing a data packet received from the SGi interface.

19. The method according to claim 14, wherein the first data packet is a downlink data packet;

wherein receiving the first data packet further comprises: receiving, by the gateway forwarding device, the first data packet according to terminal user information comprised in the first control information generated by the gateway controller, wherein the terminal user information corresponds to a manner of processing a data packet received from an SGi interface; and wherein parsing the first data packet according to the first control information further comprises: encapsulating, by the gateway forwarding device, the first data packet according to evolved node B (eNB) user plane information comprised in the first control information, wherein the eNB user plane information is used to define a manner of processing a data packet received from the SGi interface.

20. A non-transitory computer readable medium having processor-executable instructions stored thereon, the processor-executable instructions, when executed, facilitating performance of the following:

receiving, by a gateway forwarding device of a gateway system, a first data packet corresponding to a first type of communication protocol, wherein the first type of communication protocol corresponds to a first network standard, wherein the first network standard is a 3GPP network standard, a trusted non-3GPP network standard, or an untrusted non-3GPP network standard;

receiving, by the gateway forwarding device, a second data packet corresponding to a second type of communication protocol, wherein the second type of communication protocol corresponds to a second network standard different from the first network standard, and the second network standard is a 3GPP network standard, a trusted non-3GPP network standard, or an untrusted non-3GPP network standard;

receiving, by the gateway forwarding device, first control information corresponding to the first network standard and second control information corresponding to the second network standard generated by a gateway controller of the gateway system, wherein the first control information indicates a manner of processing the first data packet and the second control information indicates a manner of processing the second data packet; and parsing, by the gateway forwarding device, the first data packet according to the first control information and the second data packet according to the second control information;

wherein in the gateway system, a control plane is separated from a forwarding plane, wherein the gateway controller is part of the control plane and the gateway forwarding device is part of the forwarding plane; and wherein the gateway forwarding device is configured to act as a serving gateway (SGW) in a 3GPP access scenario, a packet data network gateway (PGW) in another 3GPP access scenario, a trusted access gateway (TGW) in a trusted non-3GPP access scenario, and an evolved packet data gateway (ePDG) in an untrusted non-3GPP access scenario.

\* \* \* \* \*